United States Patent
Ahn et al.

(10) Patent No.: US 11,184,582 B2
(45) Date of Patent: Nov. 23, 2021

(54) TERMINAL AND OPERATING METHOD THEREOF

(71) Applicant: HYPERCONNECT, INC., Seoul (KR)

(72) Inventors: Sang Il Ahn, Chungcheongbuk-do (KR); Oh Sung Kang, Seoul (KR)

(73) Assignee: Hyperconnect, Inc., Seoul (KR)

( * ) Notice: Subject to any disclaimer, the term of this patent is extended or adjusted under 35 U.S.C. 154(b) by 0 days.

(21) Appl. No.: 17/036,915

(22) Filed: Sep. 29, 2020

(65) Prior Publication Data

US 2021/0099672 A1    Apr. 1, 2021

(30) Foreign Application Priority Data

Oct. 1, 2019    (KR) .................. 10-2019-0121524

(51) Int. Cl.
*H04N 7/14* (2006.01)

(52) U.S. Cl.
CPC .................... *H04N 7/141* (2013.01)

(58) Field of Classification Search
CPC ................... H04N 7/14; H04N 7/15
USPC ........................... 348/14.01–14.16
See application file for complete search history.

(56) References Cited

U.S. PATENT DOCUMENTS

| | | | |
|---|---|---|---|
| 6,590,601 B2 | 7/2003 | Sukeno et al. | |
| 7,321,384 B1 | 1/2008 | Wu et al. | |
| 7,564,476 B1 | 7/2009 | Coughlan et al. | |
| 8,165,416 B2 | 4/2012 | Cutler | |
| 8,626,879 B2 | 1/2014 | Dham et al. | |
| 8,977,063 B2 | 3/2015 | Lee et al. | |
| 9,225,897 B1 | 12/2015 | Sehn | |
| 9,230,328 B1 | 1/2016 | Wotzlaw | |
| 9,282,287 B1 | 3/2016 | Marsh | |
| 9,319,632 B2 | 4/2016 | Kim et al. | |
| 9,460,340 B2 | 10/2016 | Kauffmann et al. | |
| 9,503,456 B1 | 11/2016 | Lindberg et al. | |
| 9,569,697 B1 | 2/2017 | Mcnerney et al. | |
| 9,591,261 B2 | 3/2017 | Suzuki et al. | |
| 9,848,167 B1 | 12/2017 | Christian et al. | |

(Continued)

FOREIGN PATENT DOCUMENTS

| | | |
|---|---|---|
| EP | 2515526 A2 | 10/2012 |
| EP | 2782326 A2 | 9/2014 |

(Continued)

OTHER PUBLICATIONS

Korean Office Action for Application No. 10-2019-0121524, dated Sep. 22, 2020.

(Continued)

*Primary Examiner* — Melur Ramakrishnaiah
(74) *Attorney, Agent, or Firm* — KPPB LLP

(57) ABSTRACT

An operating method of a terminal may include establishing a video call session between the terminal and a counterpart terminal; acquiring a first video that is captured by the terminal and includes a plurality of frames; censoring the first video based on a censorship algorithm for determining whether or not at least one object preset as an inappropriate element is included in a frame within a predetermined video; and displaying the first video instead of a second video received from a counterpart terminal when it is determined that the at least one object is included in at least one of the plurality of frames as a result of censoring the first video.

16 Claims, 17 Drawing Sheets

(56) References Cited

U.S. PATENT DOCUMENTS

| | | | |
|---|---|---|---|
| 10,574,941 B2 | 2/2020 | Ahn et al. | |
| 10,791,261 B2 | 9/2020 | Oyman et al. | |
| 10,855,933 B2 | 12/2020 | Ahn et al. | |
| 10,965,907 B2 | 3/2021 | Ahn et al. | |
| 11,080,325 B2 | 8/2021 | Ahn et al. | |
| 2003/0091239 A1 | 5/2003 | Imagawa et al. | |
| 2003/0126267 A1 | 7/2003 | Gutta et al. | |
| 2004/0049780 A1* | 3/2004 | Gee | H04N 21/44008 725/32 |
| 2007/0195158 A1* | 8/2007 | Kies | H04M 1/663 348/14.01 |
| 2008/0012935 A1* | 1/2008 | Echtenkamp | H04N 21/43637 348/14.02 |
| 2008/0259154 A1 | 10/2008 | Garrison et al. | |
| 2008/0298571 A1 | 12/2008 | Kurtz et al. | |
| 2009/0049467 A1 | 2/2009 | Robson et al. | |
| 2010/0017818 A1 | 1/2010 | Joshi et al. | |
| 2010/0054592 A1 | 3/2010 | Nanu et al. | |
| 2010/0124941 A1 | 5/2010 | Cho | |
| 2012/0155759 A1 | 6/2012 | Kang et al. | |
| 2012/0182379 A1 | 7/2012 | Ding | |
| 2012/0320141 A1 | 12/2012 | Bowen et al. | |
| 2013/0083155 A1* | 4/2013 | Andresen | H04L 51/04 348/14.08 |
| 2013/0147897 A1 | 6/2013 | Ichimura et al. | |
| 2013/0342633 A1 | 12/2013 | Ikeda et al. | |
| 2014/0176732 A1 | 6/2014 | Cohen et al. | |
| 2014/0267583 A1 | 9/2014 | Zhu et al. | |
| 2015/0030314 A1 | 1/2015 | Skarakis | |
| 2015/0070516 A1 | 3/2015 | Shoemake et al. | |
| 2015/0229882 A1 | 8/2015 | Liu | |
| 2015/0286858 A1 | 10/2015 | Shaburov et al. | |
| 2015/0325023 A1 | 11/2015 | Gross | |
| 2015/0370474 A1 | 12/2015 | Belaunde et al. | |
| 2016/0019412 A1 | 1/2016 | Kang et al. | |
| 2016/0034786 A1 | 2/2016 | Suri et al. | |
| 2016/0127653 A1 | 5/2016 | Lee et al. | |
| 2016/0373571 A1* | 12/2016 | Woolsey | H04M 1/72563 |
| 2017/0251336 A1 | 8/2017 | Keller | |
| 2018/0027042 A1* | 1/2018 | Kim | H04L 65/4015 348/14.12 |
| 2018/0103234 A1 | 4/2018 | Ahn et al. | |
| 2018/0260577 A1 | 9/2018 | Adams et al. | |
| 2018/0316892 A1 | 11/2018 | Jeong et al. | |
| 2019/0188453 A1 | 6/2019 | Ahn et al. | |
| 2019/0199963 A1 | 6/2019 | Ahn et al. | |
| 2019/0238759 A1 | 8/2019 | Ahn | |
| 2019/0251118 A1 | 8/2019 | Ahn et al. | |
| 2019/0266444 A1* | 8/2019 | Ryan, Jr. | G06K 9/6256 |
| 2020/0137352 A1 | 4/2020 | Ahn et al. | |
| 2020/0145613 A1 | 5/2020 | Ahn et al. | |
| 2020/0213530 A1 | 7/2020 | Ahn | |
| 2020/0242750 A1* | 7/2020 | Kokkula | G06K 9/70 |
| 2020/0358904 A1 | 11/2020 | Ahn et al. | |
| 2021/0203880 A1 | 7/2021 | Ahn et al. | |
| 2021/0203882 A1 | 7/2021 | Ahn et al. | |

FOREIGN PATENT DOCUMENTS

| | | |
|---|---|---|
| EP | 3035283 A1 | 6/2016 |
| EP | 3800879 A1 | 4/2021 |
| JP | H09200714 A | 7/1997 |
| JP | 2001309325 A | 11/2001 |
| JP | 2003219383 A | 7/2003 |
| JP | 2006270380 A | 10/2006 |
| JP | 2012018571 A | 1/2012 |
| JP | 2012054897 A | 3/2012 |
| JP | 2017228224 A | 12/2017 |
| JP | 2019047357 A | 3/2019 |
| KR | 20010000426 A | 1/2001 |
| KR | 20040064972 A | 7/2004 |
| KR | 100844334 B1 | 7/2008 |
| KR | 20080110064 A | 12/2008 |
| KR | 20110019499 A | 2/2011 |
| KR | 20110025720 A | 3/2011 |
| KR | 20110073238 A | 6/2011 |
| KR | 20120090870 A | 8/2012 |
| KR | 20120126677 A | 11/2012 |
| KR | 20140012474 A | 2/2014 |
| KR | 20150087362 A | 7/2015 |
| KR | 20180000255 A | 1/2018 |
| KR | 10-2018-0116520 A | 10/2018 |
| KR | 10-2019-0007934 A | 1/2019 |
| KR | 20190016671 A | 2/2019 |
| KR | 101989842 B1 | 6/2019 |
| WO | 2012131932 A1 | 10/2012 |
| WO | 2014100774 A1 | 6/2014 |
| WO | 2015091487 A1 | 6/2015 |
| WO | 2015162647 A1 | 10/2015 |
| WO | 2016112299 A1 | 7/2016 |

OTHER PUBLICATIONS

Extended European Search Report for European Patent Application No. 20199235.1, dated Feb. 19, 2021.

Communication for Korean Patent Application No. 10-2017-0048893, dated Apr. 16, 2018, 9 Pgs.

Communication in European Patent Office in Application No. 20173922.4, dated Oct. 9, 2020, 7 Pgs.

Communication in Korean Patent Office in Application No. 10-2018-0174192, dated Nov. 25, 2019, 9 Pgs.

Communication in Korean Patent Office in Application No. 10-2019-0054670, dated Apr. 21, 2020, 11 Pgs.

Extended European Search Report for Application No. 18213173.0, dated May 7, 2019, 8 Pgs.

Extended European Search Report for European Application No. 19156400.4, Search completed Apr. 11, 2019, dated Apr. 24, 2019, 11 Pgs.

Extended Search Report for European Application No. 17859740.7, Search completed Sep. 16, 2019 , dated Sep. 24, 2019, 10 Pgs.

Extended Search Report for European Application No. 21154208.9, Search completed May 21, 2021 , dated Jun. 4, 2021,9 Pgs.

International Search Report and Written Opinion for International Application No. PCT/KR2018/000787, Search completed Apr. 26, 2018, dated Apr. 26, 2018, 12 Pgs.

International Search Report dated Jan. 18, 2018 in International Application No. PCT/KR2017/011139, in 3 pages.

Korean Office Action for Application No. 10-2017-0181512, dated Mar. 8, 2019, 8 Pgs.

Korean Office Action of KR 10-2020-0012270 dated Nov. 30, 2020, 5 Pgs.

Office Action dated Aug. 29, 2017 of Korean Patent Application No. 10-2016-0130656 which is the parent Application—6 pages.

Office Action dated Feb. 14, 2014 of Korean Patent Application No. 10-2016-0130656 which is the parent Application—5 pages.

Office Action issued from Korean Patent Application No. 10-2020-0012233, dated Nov. 20, 2020, 5 Pgs.

Office Action issued in Japanese Patent Application No. 2018-238541, dated Dec. 10, 2019, 12 Pgs.

Office Action dated Nov. 30, 2018 in Korean Application No. 10-2018-0134869, in 5 pages.

Translation of Office Action dated Jun. 29, 2020 in Japanese Application No. 2019-540499, in 3 pages.

Communication issued in Korean Patent Office in Application No. 10-2018-0012389, dated Jul. 31, 2019, 11 Pgs.

Dou et al., "Coarse-to-Fine Trained Multi-Scale Convolutional Neural Networks for Image Classification," IEEE, 2015, 7 Pgs.

Freitas et al., "A Multimodal CNN-Based Tool to Censure Inappropriate Video Scenes", arxiv.org, Cornell University Library, Nov. 10, 2019, XP081529770.

Sood et al., "Automatic Identification of Personal Insults on Social News Sites", Journal of The American Society for Information Science and Technology, Feb. 1, 2012, vol. 63, No. 2, pp. 270-285, Published Online Oct. 28, 2011.

Xing et al., "SafeVchat: Detecting Obscene Content and Misbehaving Users in Online Video Chat Services", World Wide Web, ACM, Mar. 28, 2011, pp. 685-694.

(56) References Cited

OTHER PUBLICATIONS

Office Action for Japanese Patent Application No. 2020-165934, dated Sep. 24, 2021.

* cited by examiner

TERMINAL AND OPERATING METHOD THEREOF

CROSS-REFERENCE TO RELATED APPLICATION

This application is based on and claims priority under 35 U.S.C. § 119 to Korean Patent Application No. 10-2019-0121524, filed on Oct. 1, 2019, in the Korean Intellectual Property Office, the disclosure of which is incorporated by reference herein in its entirety.

BACKGROUND

1. Field

Embodiments relate to a terminal capable of preventing a user making a video call with a counterpart from being exposed to an inappropriate video from the counterpart, and an operating method thereof.

2. Description of Related Art

With an increase in communication technology and miniaturization of electronic devices, personal terminals are widely distributed to general consumers. In particular, portable personal terminals such as smart phones or smart tablets have been widely distributed in recent years. Most of the terminals include a communication function. A user may search the Internet or exchange messages with other users by using a terminal.

In addition, with increases in small camera technology, small microphone technology, small display technology, and small speaker technology, most terminals such as smartphones include cameras, microphones, displays, and speakers. A user may record a voice or capture a video including the voice by using a terminal. A user may check the recorded voice through a speaker included in the terminal or check the captured video through a display.

In addition, a user may share the recorded voice or the captured video with another user by using a communication function of a terminal. A user may transmit the previously recorded voice or the previously captured video to another user. In addition, a user may transmit a voice currently being recorded or a video currently being captured by a terminal to another user in real time.

In addition, at the same time, another user may transmit a voice currently being recorded or a video currently being captured by his/her terminal to the user in real time. A display included in a terminal of a user may simultaneously display a video currently being captured by his/her terminal and a video currently being captured by a terminal of another user. In addition, a speaker included in a terminal of a user may simultaneously play a voice currently being recorded by a terminal of another user. In other words, a user and another user may make a video call with each other by using their respective terminals.

The two users may know each other or may not know each other. A plurality of terminals including a terminal of the user and a terminal of another user may be connected to a server. A server may mediate between a user's terminal and another user's terminal. Accordingly, even though a user and another user do not know each other, the user and the other user may make a video call with each other through mediation of a server. In addition, a user and another user may make a direct video call with their respective terminals without mediation of a server.

When a user makes a video call with a counterpart, the user may be exposed to an obscene video from the counterpart. In particular, when a user makes a video call with a counterpart who does not know the user, there may be a high possibility that the user is exposed to an obscene video from the counterpart.

For example, a video of a naked body of the counterpart which is captured by the counterpart's terminal may be received by the user's terminal through a video call session. As the user's terminal displays the received video, the user may be exposed to the obscene video. When a user is exposed to an obscene video that he/she does not want, the user may feel sexual shame or displeasure.

SUMMARY

According to embodiments, there are provided a terminal capable of preventing a user making a video call with a counterpart from being exposed to an obscene video from the counterpart, and an operating method of the terminal.

In addition, there are provided a terminal capable of preventing a user making a video call with a counterpart from feeling sexual shame or displeasure due to a video from the counterpart, and an operation method the terminal.

In addition, there are provided a terminal capable of inducing a sound video call between users and an operating method of the terminal.

Additional aspects will be set forth in part in the description which follows and, in part, will be apparent from the description, or may be learned by practice of the presented embodiments of the disclosure.

According to an embodiment, an operating method of a terminal includes establishing a video call session between the terminal and a counterpart terminal; acquiring a first video that is captured by the terminal and includes a plurality of frames; censoring the first video based on a censorship algorithm for determining whether or not at least one object preset as an inappropriate element is included in a frame within a predetermined video; and displaying the first video instead of a second video received from a counterpart terminal when it is determined that the at least one object is included in at least one of the plurality of frames as a result of censoring the first video.

According to another embodiment, a terminal includes a communication interface that communicates with an external device; an input/output interface that includes a display; a processor; and a memory that stores commands capable of being executed by the processor, wherein the processor executes the commands to establish a video call session between the terminal and a counterpart terminal, acquire a first video including a plurality of frames imaged by the terminal, censor the first video based on a censorship algorithm for determining whether or not at least one object preset as an inappropriate element is included in a frame of a predetermined video, and display the first video on the display instead of a second video received from the counterpart terminal when it is determined that the at least one object is included in at least one of the plurality of frames as a result of censoring the first video.

According to another embodiment, a server includes a communication interface that communicates with a plurality of terminals; a storage; a processor; and a memory that stores commands executed by the processor, wherein the processor executes the commands to learn a censorship algorithm for detecting a frame including the at least one object based on a plurality of reference frames and information indicating whether or not the at least one object preset as an inappropriate element is included in each of the plurality of reference frames, check establishment of a video call session between a first terminal and a second terminal, receive a first video that is captured by the first terminal and includes a plurality of frames, from the first terminal, censor the first video based on the censorship algorithm, and control an operation of the first terminal so that the first video is displayed instead of a second video received from the second terminal when it is determined that the at least one object is included in at least one of the plurality of frames as a result of censoring the first video.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
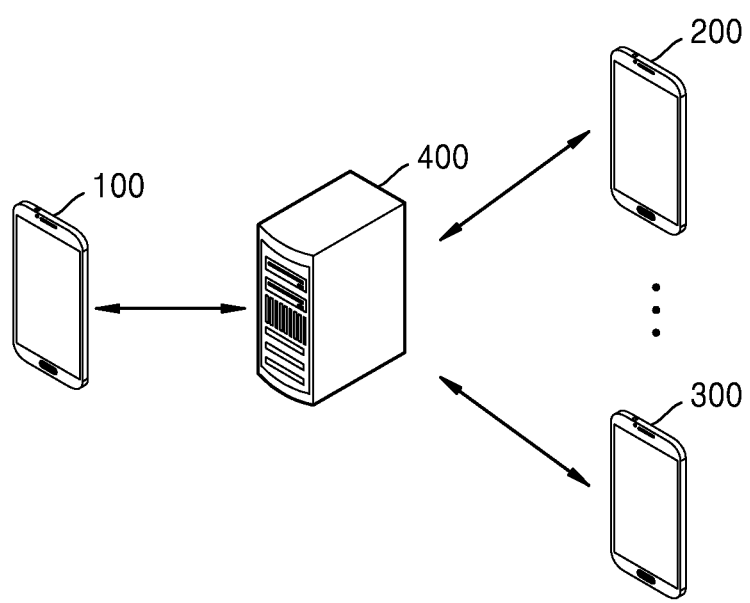
FIG. 1 is a system configuration diagram illustrating an environment in which an electronic device according to an embodiment of the present disclosure operates.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure, and an achieving method thereof will become apparent by referring to the embodiments described below in detail together with the accompanying drawings. However, the present disclosure is not limited to the embodiments disclosed below and will be implemented in various forms, the present embodiments are only intended to complete the present disclosure and are provided to completely inform the scope of the disclosure to those skilled in the art to which the present disclosure belongs, and the present disclosure is only defined by the scope of claims. The same reference numerals refer to the same configuration elements throughout the specification.

Although "first" or "second" is used to describe various configuration elements, the configuration elements are not limited by the terms described above. The terms described above may be used only to distinguish one configuration element from another configuration element. Accordingly, the first configuration element described below may be a second configuration element within the technical idea of the present disclosure.

The terms used in the present specification are used to describe examples and are not intended to limit the present disclosure. In the present specification, the singular form also includes the plural form unless specifically stated in the phrase. As used herein, "comprises" or "comprising" is implied that the recited configuration element or step does not exclude presence or addition of one or more other configuration elements or steps.

Unless otherwise defined, all terms used in the present specification may be interpreted as meaning that may be commonly understood by those skilled in the art to which the present disclosure belongs. In addition, the terms defined in a commonly used dictionary are not interpreted ideally or excessively unless explicitly defined in particular.

FIG. 1 is a system configuration diagram illustrating an environment in which an electronic device according to an embodiment of the present disclosure operates.

Referring to FIG. 1, a system environment in which a plurality of terminals 100 to 300 operate may include a server 400 and the plurality of terminals 100 to 300. For example, the environment in which the plurality of terminals 100 to 300 operate may include at least one server.

The plurality of terminals 100 to 300 may be connected to each other through the server 400. For the sake of convenient description of the present disclosure, three terminals are illustrated in FIG. 1. However, the number of terminals is not limited to three. Each of the plurality of terminals 100 to 300 may be one of a desktop computer, a laptop computer, a smartphone, a smart tablet, a smart watch, a mobile terminal, a digital camera, a wearable device, and a portable electronic device. Each of the plurality of terminals 100 to 300 may execute a program or an application.

Each of the plurality of terminals 100 to 300 may be connected to a communication network. The plurality of terminals 100 to 300 may be connected to each other through a communication network or may be connected to the server 400. Each of the terminals 100 to 300 may output data to or receive data from other devices connected to each other.

A communication network connected to each of the plurality of terminals 100 to 300 may include a wired communication network, a wireless communication network, or a complex communication network. The communication network may include a mobile communication network such as 3G, LTE, or LTE-A. The communication network may include a wired or wireless communication network such as Wi-Fi, UMTS/GPRS, or Ethernet.

The communication network may include a local area communication network such as magnetic secure transmission (MST), radio frequency identification (RFID), near field communication (NFC), ZigBee, Z-Wave, Bluetooth, and Bluetooth low energy (BLE), or infrared communication (IR).

The communication network may include a local area network (LAN), a metropolitan area network (MAN), or a wide area network (WAN).

Various types of communication sessions may be established between the plurality of terminals 100 to 300. For example, at least two terminals of the plurality of terminals 100 to 300 may exchange messages, files, voice data, videos, or videos with each other. For example, at least two terminals may establish a voice call session or a video call session by using transmission control protocol (TCP), user datagram protocol (UDP), or web real-time communication (WebRTC).

The video call session may be established directly between at least two terminals. According to another embodiment, the video call session may be established between at least two terminals via one or more other devices. For example, the video call session may include a session established between the first terminal 100 and the server 400 and a session established between the server 400 and the second terminal 200.

The server 400 may connect the plurality of terminals 100 to 300 to each other to communicate with each other. For example, the server 400 may receive a match request from each of the plurality of terminals 100 to 300. In response to the match request, the server 400 may match at least two terminals of the plurality of terminals 100 to 300.

Figure 2:
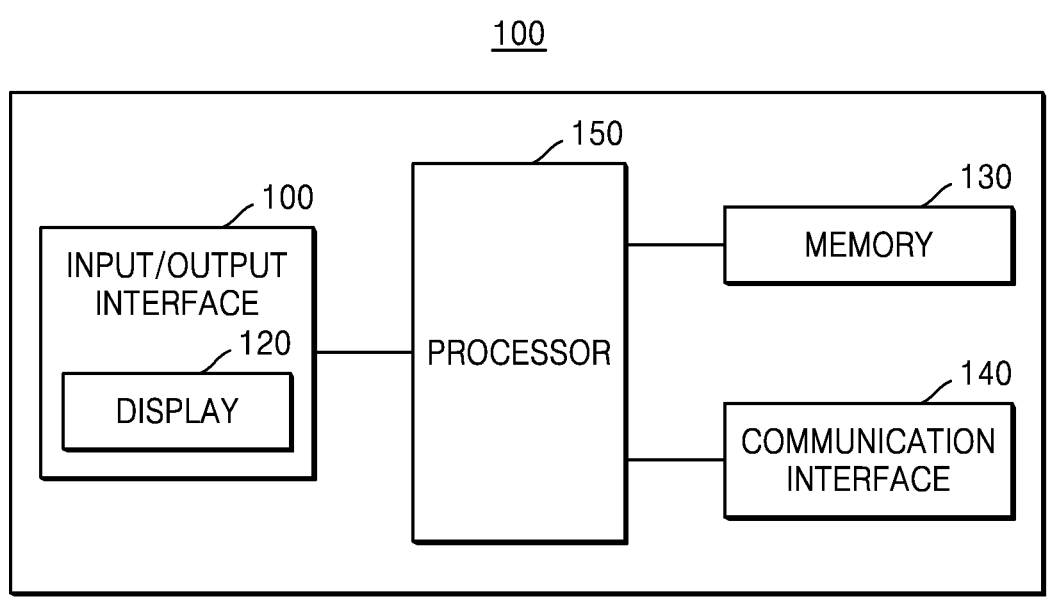
FIG. 2 is a block diagram illustrating a configuration of a terminal according to an embodiment of the present disclosure.

FIG. 2 is a block diagram illustrating a configuration of the terminal according to the embodiment of the present disclosure. Referring to FIG. 2, the terminal 100 may include an input/output interface 110, a display 120, a memory 130, a communication interface 140, and a processor 150. Each of the second terminal 200 and the third terminal 300 illustrated in FIG. 1 may have a similar configuration to or the same configuration as the terminal 100.

The input/output interface 110 may receive a signal from the outside. The input/output interface 110 may receive a signal from a user of the terminal 100. In addition, the input/output interface 110 may receive a signal from an external device. The input/output interface 110 may include, for example, a microphone, a camera, a keyboard, a mouse, a trackball, a touch screen, a button, a switch, a sensor, a network interface, or other input device. The input/output interface 110 may receive a voice from the outside through a microphone included in the input/output interface 110.

In addition, the input/output interface 110 may receive a video or a video captured from a camera (not illustrated) included in the input/output interface 110 or receive a gesture from a user of the terminal 100. In some embodiments, the input/output interface 110 may receive a video captured from the terminal 100. The video captured by the terminal 100 may include a video of the user of the terminal 100. The video received from the first terminal 100 is not limited to the video of the user of the terminal 100 and may include various videos captured by the terminal 100.

The input/output interface 110 may include the display 120. For example, the display 120 may include a flat panel display device such as a liquid crystal display (LCD), an organic light emitting diode (OLED), or a plasma display panel (PDP). The display 120 may include a curved display or a flexible display. The display 120 may include a touch screen. When the display 120 includes a touch screen, the display 120 may receive a touch input from a user of the terminal 100.

The display 120 may display data. Alternatively, the display 120 may display results of arithmetic performed by the processor 150. Alternatively, the display 120 may display data stored in the memory 130. The display 120 may display data received through the input/output interface 110 or data received by the communication interface 140.

The display 120 may display a screen. The display 120 may display a user interface. The display 120 may display another screen in response to an input from a user.

The display 120 may display data. The display 120 may display results of arithmetic performed by the processor 150. The display 120 may display data stored in the memory 130. The display 120 may display data received by the communication interface 140. For example, the display 120 may display a video received from the server 400, the second terminal 200, or the third terminal 300. As another example, the display 120 may display a video received by the input/output interface 110.

The display 120 may include, for example, a flat panel display device such as a liquid crystal display (LCD), an organic light emitting diode (OLED) display, or a plasma display panel (PDP) display. The display 120 may include a curved display or a flexible display. The display 120 may include a touch screen.

The memory 130 may store data. The memory 130 may store voice data, video data, or user profile information received from the input/output interface 110. In addition, the memory 130 may store results of arithmetic performed by the processor 150. For example, the memory 130 may store a voice encoded by the processor 150. The memory 130 may store data to be output to the outside through the communication interface 140 or may store data received from the outside through the communication interface 140.

The memory 130 may store software or programs. For example, the memory 130 may store an application, a program such as an application programming interface (API), and various types of data. The memory 130 may store commands that may be executed by the processor 150.

The memory 130 may include at least one of a volatile memory or a nonvolatile memory. The memory 130 may include at least one of, for example, a flash memory, read only memory (ROM), random access memory (RAM), electrically erasable ROM (EEROM), erasable programmable ROM (EPROM), electrically erasable programmable ROM (EEPROM), a hard disk drive (HDD), and a register. The memory 130 may include, for example, a file system, a database, or an embedded database.

The communication interface 140 may output data to the outside of the terminal 100 or may receive data from the outside. The communication interface 140 may output data to the server 400 or an external device. The communication interface 140 may receive data from the server 400 and the external device. The communication interface 140 may output, to the outside, results of arithmetic performed by the processor 150.

In some embodiments, when an application for providing a video call session is executed by the terminal 100, the communication interface 140 may receive a video or a voice from the second terminal 200 or the third terminal 300.

In addition, when an application for providing a video call session is executed by the terminal 100, the communication interface 140 may transmit a video captured by a user of the terminal 100 or a voice of the user of the terminal 100 to the second terminal 200 or the third terminal 300.

The communication interface 140 may include a remote network interface such as a 3G module, an LTE module, an LTE-A module, a Wi-Fi module, a WiGig module, an ultra wide band (UWB) module, or a LAN card. In addition, the communication interface 140 may include a local area network interface such as a magnetic security output (MST) module, a Bluetooth module, an NFC module, an RFID module, a ZigBee module, a Z-Wave module, or an infrared module. In addition, the communication interface 140 may include other network interfaces.

The processor 150 or each of configuration elements included in the processor 150 may be implemented in the form of software or hardware. For example, the software may be implemented by program execution commands such as machine code, firmware code, embedded code, or an application. The hardware may be an electric and electronic circuit, a processor, a computer, a pressure sensor, an inertial sensor, a microelectromechanical system (MEMS), passive elements, or a combination thereof.

The processor 150 may control an operation of the terminal 100. The processor 150 may be connected to each configuration element included in the terminal 100 and may control an operation of each configuration element included in the terminal 100. The processor 150 may control the operation of the terminal 100 in response to a signal received by the input/output interface 110.

In some embodiments, when an application for providing a video call session is executed by the terminal 100, the processor 150 may recognize a video of a user of the terminal 100 which is received through the input/output interface 110. The processor 150 may censor the video of the user of the terminal 100.

In some embodiments, the processor 150 may censor the video of the user of the terminal 100 by using a prepared learning model. As another embodiment, the processor 150 may randomly select and censor one frame constituting the video of the user of the terminal 100 by using the prepared learning model.

Detailed operation methods of the plurality of terminals 100 to 300 and the server 400 may be described with reference to FIGS. 3 to 17.

Figure 3:
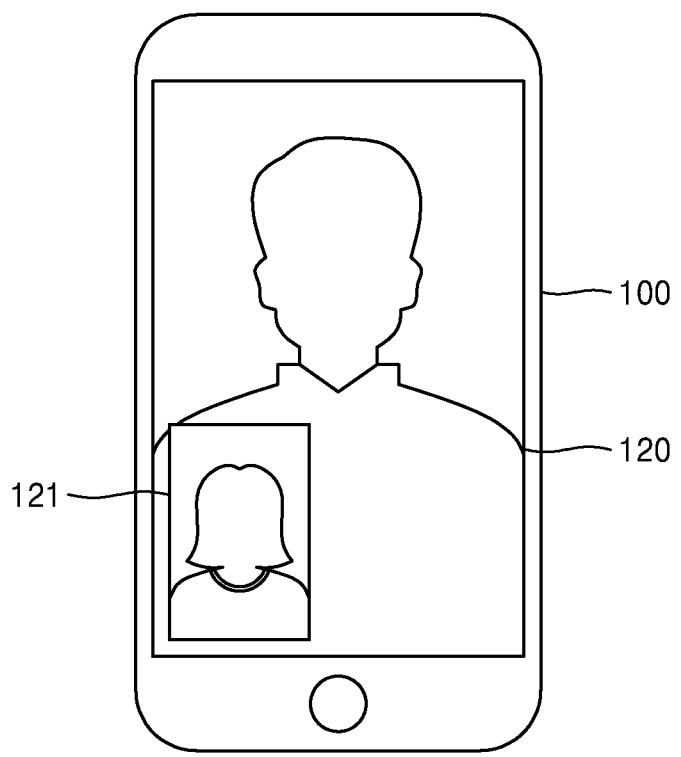
FIG. 3 is a view illustrating a method of executing an application for providing a video call session by using a terminal, according to an embodiment of the present disclosure.

FIG. 3 is a view illustrating a method of executing an application for providing a video call session by using a terminal according to an embodiment of the present disclosure.

Referring to FIGS. 1 to 3, a user of the terminal 100 may execute an application for providing a video call session. A user of the terminal 100 may be matched with one terminal other than the terminal 100 among a plurality of terminals 100 to 300 through an application for providing a video call session. In some embodiments, the terminal matching the terminal 100 may be randomly selected through an application for providing real-time mediation broadcasting.

For the sake of convenient description of the present disclosure, it may be assumed that a terminal matching the terminal 100 is a counterpart terminal 200. However, the terminal matching the terminal 100 is not limited to the counterpart terminal 200.

In some embodiments, when the terminal 100 matches the counterpart terminal 200, the display 120 of the terminal 100 may display a video received from the counterpart terminal 200 and a video captured by the terminal 100. In some embodiments, the video received from the counterpart terminal 200 may include a video of a user of the counterpart terminal 200. The video received from the counterpart terminal 200 is not limited to the video of the user of the counterpart terminal 200 and may include various videos captured by the counterpart terminal 200.

In some embodiments, a video received from the counterpart terminal 200 may be displayed on the entire region of the display 120 of the terminal 100. In addition, a video captured by the terminal 100 may be displayed on a partial region 121 of the display 120. At the same time, the video captured by the terminal 100 may be output to the counterpart terminal 200 through the communication interface 140.

In some embodiments, the processor 150 of the terminal 100 may censor the video captured by the terminal 100 before displaying and outputting the video. More specifically, the processor 150 of the terminal 100 determines whether or not the video captured by the terminal 100 includes an inappropriate element, and when the video captured by the terminal 100 includes an inappropriate element, the processor 150 may perform a censorship. An operation of the processor of the terminal 100 may be described in detail with reference to FIGS. 5 to 15.

Figure 4:
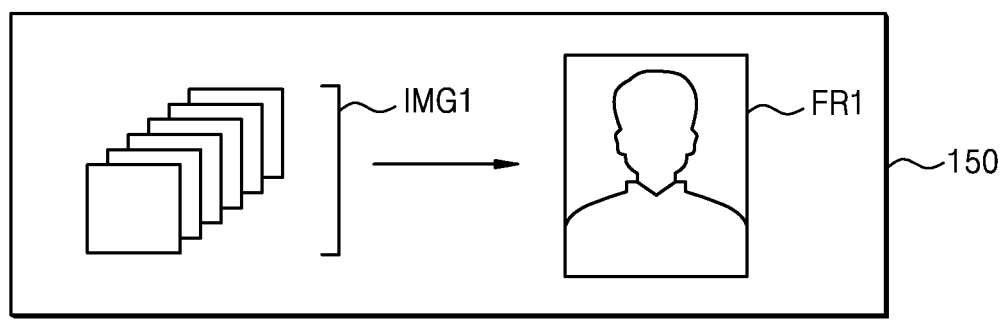
FIG. 4 is a view illustrating a method of censoring a video before a video call session is established by using a terminal, according to an embodiment of the present disclosure.

FIG. 4 is a view illustrating a method of censoring a video before a video call session is established in a terminal according to an embodiment of the present disclosure.

Referring to FIGS. 2 and 4, when the processor 150 of the terminal 100 executes an application for providing a video call session, a video may be received through the input/output interface 110 of the terminal 100. In some embodiments, before the terminal 100 establishes a video call session with a certain terminal, a video may be received through the input/output interface 110 during a standby time. The video received during the standby time may include a plurality of frames. It may be assumed that the video received during the standby time is a first video IMG1.

The processor 150 may censor at least one frame of a plurality of frames included in the first video IMG1 by using a censorship algorithm. In some embodiments, at least one frame may be randomly selected from among a plurality of frames. For example, it may be assumed that the selected frame is the first frame FR1.

The processor 150 may determine whether or not an inappropriate element is included in the first frame FR1 by using the censorship algorithm.

In some embodiments, the censorship algorithm may include at least one of a deep neural network (DNN), a convolutional neural network (CNN), a recurrent neural network (RNN), a region-based convolutional neural network (R-CNN), a restricted Boltzmann machine (RBM), a deep trust neural network (DBN), and deep Q-Networks.

In some embodiments, the censorship algorithm may include a CNN. The censorship algorithm may include AlexNet, ZFNet, GoogLeNet, VGGNet, ResNet, Inception-ResNet, Inception-v2, Inception-v3, or Inception-v4.

The censorship algorithm may include a neural network including at least two or more layers. A pre-censorship algorithm may include an input layer and an output layer. The censorship algorithm may further include at least one hidden layer.

The censorship algorithm may be a classification model learned by using classification information on whether or not an inappropriate element is included in a certain video frame and a certain frame. The certain video frames may be previously collected through a video call session or other sources.

The certain video frame may include at least one of an inappropriate video frame including an inappropriate element, or a normal video frame including a normal element without including an inappropriate element. The classification information may be tag information corresponding to whether or not each certain video frame is an inappropriate video frame or a normal video frame.

For example, the censorship algorithm may be an algorithm in which an operation of detecting a frame including at least one object is learned, based on a plurality of reference frames and information indicating whether or not at least one object preset as an inappropriate element is included in each of a plurality of reference frames.

For example, at least one object may include at least one of a preset body part, a preset gesture, a preset article, and a preset material, and may be associated with an inappropriate element.

For example, information for determining an inappropriate reference frame and a normal reference frame may be tag information indicating whether each of the reference frames is an inappropriate reference frame or a normal frame.

For example, a processor in the terminal 100 or a processor of a server may acquire a predetermined reference frame and tag information of the predetermined reference frame as input information. The processor in the terminal 100 or the processor of the server may learn a predetermined reference frame based on the tag information of the predetermined reference frame through an artificial neural network to learn a criterion for determining whether or not at least one object preset as an inappropriate element is included in the predetermined frame.

For example, a criterion for determining whether or not at least one object preset as an inappropriate element is included in a predetermined frame may be a criterion for determining a probability that there is at least one object in a predetermined frame by using at least one of a configuration of at least one object, a color of at least one object, and an arrangement between at least one object and surrounding objects. For example, when a probability that there is at least one object in a predetermined frame is 90% or more, the predetermined frame may be determined as an inappropriate frame including an inappropriate element. A threshold probability that there is at least one object with respect to the criterion to be determined as an inappropriate frame may be preset. In addition, the threshold probability may be adjusted by an administrator.

For example, a criterion for determining whether or not at least one object preset as an inappropriate element is included in a predetermined frame may be a criterion for determining a similarity between an inappropriate reference frame including at least one object and a predetermined frame. For example, the similarity may be a value representing a degree of similarity between a reference frame and a predetermined frame by using at least one of a configuration of at least one object in a frame, a color of at least one object, and an arrangement between at least one object and surrounding objects. For example, when a similarity between an inappropriate reference frame and a predetermined frame is 90% or more, the predetermined frame may be determined as an inappropriate frame including an inappropriate element. A threshold similarity to a criterion to be determined as an inappropriate frame may be preset. In addition, the threshold similarity may be adjusted by an administrator.

In addition, a processor in the terminal 100 or a processor of a server may determine whether or not a video including a plurality of frames or a predetermined frame includes at least one object, based on results of learning a plurality of reference frames, and may learn a censorship algorithm that detects a frame including at least one object.

In addition, the processor in the terminal 100 or the processor of the server may update a censorship algorithm based on results of learning a frame detected from the censorship algorithm or a frame reported as an inappropriate frame from an external terminal 100.

In some embodiments, the inappropriate element may correspond to at least one of abusive gesture, insulting gesture, racist gesture, sexual content, nudity, genitals, sexual activity, unsanitary content, excrement, act of excretion, antisocial content, anti-human content, illegal activity, criminal behavior, hate crime, violent behavior, abusive behavior, self-harm behavior, weapons, drugs, anti-social symbols, hateful content, threatening content, phobia-inducing content, and blood. The inappropriate element is not limited to the above-described embodiments and may include various elements that cause disgust.

The terminal 100 may receive a censorship algorithm from the server 400 through the communication interface 140. The received censorship algorithm may be stored in the memory 130 of the terminal 100. In some embodiments, the censorship algorithm may be included in an application for providing a video call session, and the terminal 100 may receive an application for providing a video call session including the censorship algorithm through the communication interface 140. In addition, an application for providing a video call session may be stored in the memory 130 of the terminal 100.

The processor 150 may take the first frame FR1 as an input value of a censorship algorithm. The processor 150 may determine whether the first frame FR1 includes a normal element or an inappropriate element by using a censorship algorithm.

In some embodiments, as a result of determination using the censorship algorithm, it may be determined that an inappropriate element is not included in the first frame FR1. When it is determined that an inappropriate element is not included in the first frame FR1, the processor 150 may determine that the first video IMG1 is a normal video.

When it is determined that the first video IMG1 is a normal video, the processor 150 may establish a video call session between the terminal 100 and one of the plurality of terminals through an application for providing a video call session.

Figure 5:
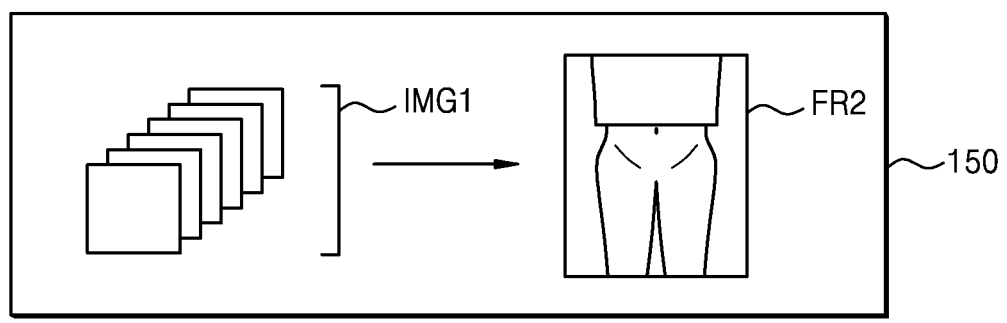
FIG. 5 is a view illustrating a method of censoring a video before a video call session is established by using a terminal, according to another embodiment of the present disclosure.

FIG. 5 is a view illustrating a method of censoring a video before a video call session is established in a terminal according to another embodiment of the present disclosure.

Referring to FIGS. 2, 4, and 5, before the terminal 100 establishes a video call session with a certain terminal, a video may be received through the input/output interface 110 during a standby time. The video received during the standby time may include a plurality of frames.

The processor 150 may censor at least one frame of a plurality of frames included in the first video IMG1 by using a censorship algorithm. In some embodiments, at least one frame may be randomly selected from among a plurality of frames. For example, it may be assumed that the selected frame is a second frame FR2.

The processor 150 may determine whether or not an inappropriate element is included in the second frame FR2 by using a censorship algorithm. The processor 150 may take the second frame FR2 as an input value of a censorship algorithm. The processor 150 may determine whether the second frame FR2 includes a normal element or an inappropriate element by using a censorship algorithm.

In some embodiments, as a result of determination using a censorship algorithm, it may be determined that an inappropriate element is included in the second frame FR2. When it is determined that the second frame FR2 includes an inappropriate element, the processor 150 may determine that the first video IMG1 is an inappropriate video.

When it is determined that the first video IMG1 is an inappropriate video, the processor 150 may limit provision of a video call session service to a user of the terminal 100.

As described with reference to FIGS. 4 and 5, the processor 150 may determine whether one of a plurality of frames included in the first video IMG1 includes a normal element or an inappropriate element, based on a censorship algorithm. The present disclosure is not limited to the disclosed embodiments, and the processor 150 may select two or more frames from among a plurality of frames included in the first video IMG1, and may determine whether each of the two or more frames includes a normal element or an inappropriate element by using a censorship algorithm.

Figure 6:
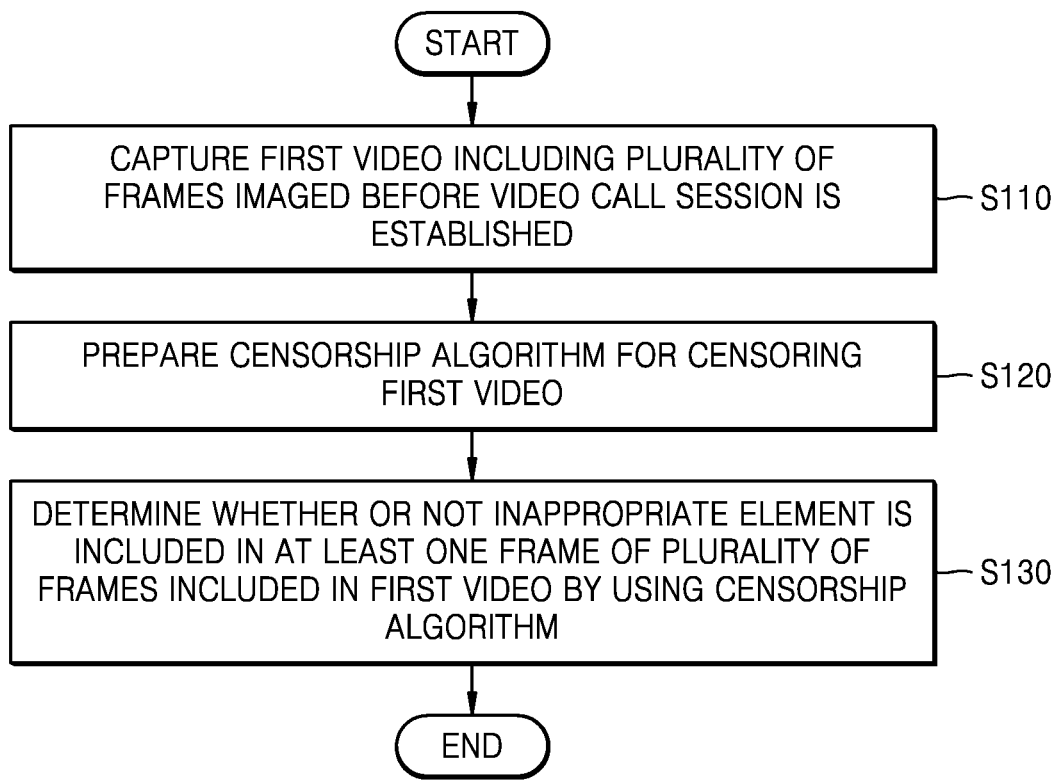
FIG. 6 is a flowchart illustrating an operating method of a terminal according to whether or not an inappropriate element is included in a video captured before a video call session is established.

FIG. 6 is a flowchart illustrating an operating method of a terminal according to whether or not an inappropriate element is included in a video captured before a video call session is established.

Referring to FIG. 2 and FIGS. 4 to 6, in step S110, the input/output interface 110 of the terminal 100 may receive a first video captured before the terminal 100 establishes a video call session with a certain terminal. A video received during a standby time may include a plurality of frames.

In step S120, the processor 150 of the terminal 100 may prepare a censorship algorithm for censoring a third video. For example, preparing the censorship algorithm may mean that the terminal 100 acquires a censorship algorithm for censoring a predetermined video and stores the acquired censorship algorithm. In addition, preparing the censorship algorithm may mean that the terminal 100 acquires a censorship algorithm for censoring a predetermined video in the terminal 100 and forms a state in which the predetermined video may be censored by using the censorship algorithm when the predetermined video is input as an input video.

A censorship algorithm learned by using an artificial intelligence technology may be included in an application for providing a video call session, and the terminal 100 may receive the application for providing the video call session including the censorship algorithm through the communication interface 140.

In step S130, the processor 150 of the terminal 100 may determine whether or not an inappropriate object is included in at least one frame of a plurality of frames included in the third video by using a censorship algorithm. In some embodiments, the processor 150 may select at least one frame from of a plurality of frames and take the selected at least one frame as an input value of a censorship algorithm.

Figure 7:
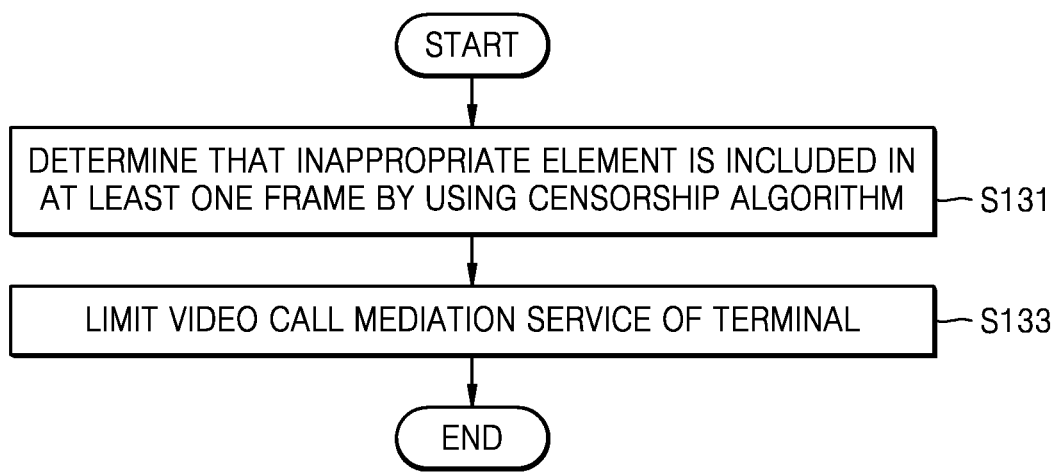
FIGS. 7 and 8 are flowcharts illustrating an operating method of a terminal according to whether or not a first video includes an inappropriate element.
Figure 8:
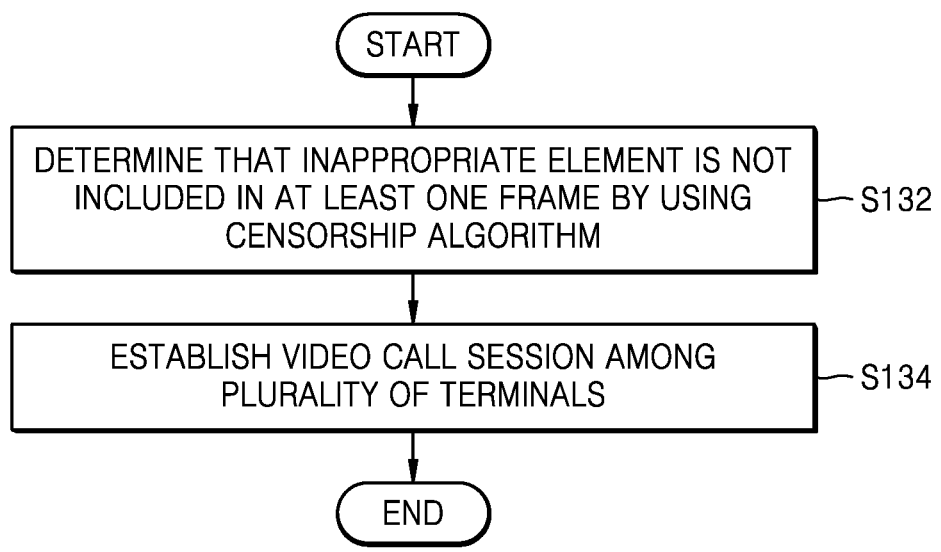

FIGS. 7 and 8 are flowcharts illustrating an operating method of a terminal according to whether or not the first video includes an inappropriate element.

Referring to FIGS. 6 and 7, in step S131, the processor 150 of the terminal 100 may determine that an inappropriate element is included in at least one frame. In some embodiments, when it is determined that an inappropriate element is included in at least one frame, the processor 150 may determine that the first video is an inappropriate video.

In step S133, when it is determined that the first video is an inappropriate video, the processor 150 may limit provision of a video call session service to a user of the terminal 100.

Referring to FIGS. 6 and 8, in step S132, the processor 150 of the terminal 100 may determine that an inappropriate element is not included in at least one frame. In some embodiments, when it is determined that an inappropriate element is not included in at least one frame, the processor 150 may determine that the first video is a normal video.

In step S134, when it is determined that the first video is a normal video, the processor 150 establishes a video call session between the terminal 100 and one of a plurality of terminals through an application for providing a video call session.

Figure 9:
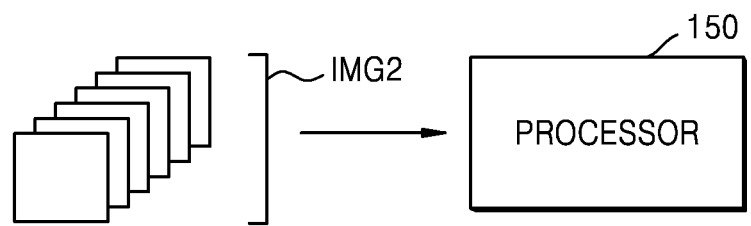
FIG. 9 is a view illustrating a method of censoring a video by using a terminal, according to another embodiment of the present disclosure.

FIG. 9 is a view illustrating a method of censoring a video by using a terminal, according to another embodiment of the present disclosure.

Referring to FIGS. 2 and 9, the processor 150 may receive the second video IMG2 captured by the terminal 100 from the input/output interface 110. The second video IMG2 may include a plurality of frames. The processor 150 may prepare a censorship algorithm for censoring the second video IMG2. As an embodiment of the present disclosure, the second video IMG2 may mean a video received after a video call session is established with the counterpart terminal 200.

In some embodiments, the processor 150 may censor each of a plurality of frames included in the second video IMG2 using the censorship algorithm.

The terminal 100 may receive a censorship algorithm from the server 400 through the communication interface 140. The received censorship algorithm may be stored in the memory 130 of the terminal 100. In some embodiments, the censorship algorithm may be included in an application for providing a video call session, and the terminal 100 may receive the application for providing the video call session including the censorship algorithm through the communication interface 140. In addition, the application for providing the video call session may be stored in the memory 130 of the terminal 100.

The processor 150 may determine whether or not an inappropriate element is included in each of a plurality of frames included in the second video IMG2 by using a censorship algorithm. The processor 150 may take each of the plurality of frames as an input value of the censorship algorithm. The processor 150 may determine whether each of the plurality of frames includes a normal element or an inappropriate element by using a censorship algorithm.

In some embodiments, when it is determined that an inappropriate element is included in at least one of a plurality of frames, the processor 150 may control an output of a video captured by the terminal 100 to the counterpart terminal 200. Alternatively, the processor 150 may perform video processing for at least one or more frames received after a frame including an inappropriate element and may output at least one video-processed frame to the counterpart terminal 200. In addition, the processor 150 may control the input/output interface 110 to display a video captured by the terminal 100 rather than a video received from the counterpart terminal 200 on the display 120 of the terminal 100.

As another embodiment, when it is determined that at least one of a plurality of frames does not include an inappropriate element, the processor 150 may maintain a video call session with the counterpart terminal 200. A video call session between the terminal 100 and the counterpart terminal 200 may be maintained until an interruption request is received by a user of the terminal 100 or one of users of the counterpart terminal 200.

Figure 10:
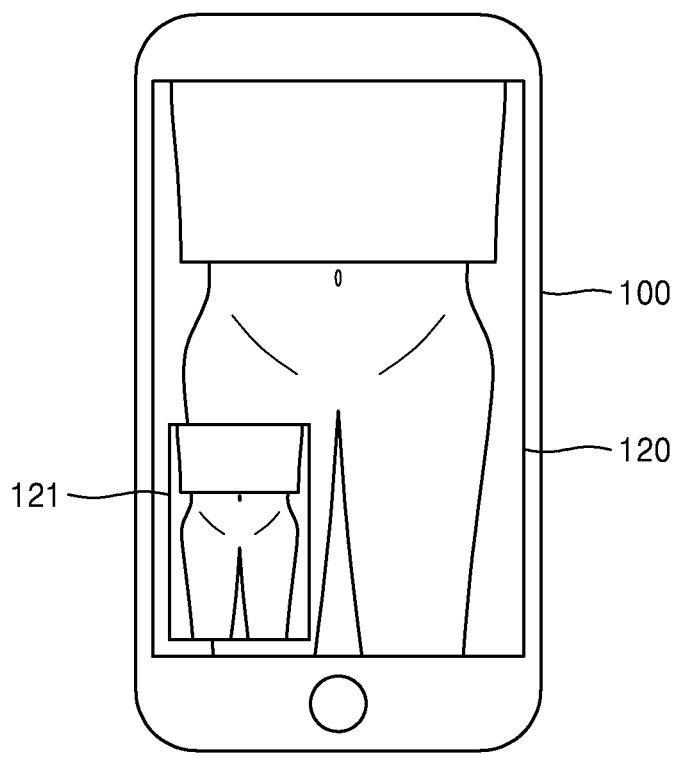
FIG. 10 is a view illustrating a video displayed on a display of a terminal according to an embodiment of the present disclosure.

FIG. 10 is a view illustrating a video displayed on a display of a terminal according to an embodiment of the present disclosure.

Referring to FIGS. 2, 9, and 10, when a video call session between the terminal 100 and a counterpart terminal is established, the processor 150 of the terminal 100 may censor a plurality of frames included in the second video IMG2 captured by the terminal 100 by using a censorship algorithm.

In some embodiments, the processor 150 sequentially censors a plurality of frames by using a censorship algorithm, and when it is determined that an inappropriate element is included in at least one of the plurality of frames, the processor 100 may control the display 120 of the terminal 100 to display a video captured by the terminal 100.

In some embodiments, when it is determined that an inappropriate element is included in at least one of the plurality of frames, the processor 150 may determine a user of the terminal 100 as a bad user. Accordingly, the processor 150 may control the display 120 so that a video received from the counterpart terminal 200 is not output after the time when the inappropriate element is detected. In addition, the processor 150 may control the display 120 to output a video captured by the terminal 100 after the time when the inappropriate element is detected, instead of the video received from the counterpart terminal 200.

For example, a region in which a video is displayed according to a video call session in the terminal 100 may be divided into a counterpart region in which a video of a counterpart is displayed and my region in which a video of a user is displayed. For example, a size of the counterpart region may be larger than a size of my region. In addition, my region may be placed at a partial position in a screen of a display on which a video is displayed, in the terminal 100. For example, the partial position may be a region near a corner of the screen. In addition, my region may be displayed to superimpose the counterpart region and may be placed in a partial region of the counterpart region.

For example, when it is determined that an inappropriate element is included in at least one frame of a plurality of frames, the processor 150 may display a frame including an inappropriate element in a region where a video of the counterpart received from the counterpart terminal 100 is intended to be displayed. In this case, display of a video of the counterpart may be stopped in the region where the video of the counterpart is intended to be displayed.

For example, when it is determined that an inappropriate element is included in at least one frame of a plurality of frames, the processor 150 may remove the region where the video of the counterpart received from the counterpart terminal 100 is intended to be displayed according to establishment of a video call session and may display a frame including an inappropriate element by enlarging a region where a video of a user acquired from the terminal 100 is intended to be displayed.

For example, the processor 150 may display the frame including the inappropriate element during a preset time. For example, the preset time may be 30 seconds, 1 minute, or so on. In addition, the terminal 100 may continuously display the frame including the inappropriate element until a video captured by the terminal 100 is determined as a normal video.

The embodiment described above may prevent a video of a user who uses an application for providing a video call session from being exposed to a bad user.

Specifically, by displaying the user's own video for providing an inappropriate element in a region where a video of a counterpart is intended to be displayed, it is possible to provide a psychological shock to a user during a video call and to stop imaging of the inappropriate element. In addition, it is possible to prevent an inappropriate video from being exposed to a counterpart of a video call by preventing an inappropriate video from being transmitted to the counterpart terminal 100 as it is.

Figure 11:
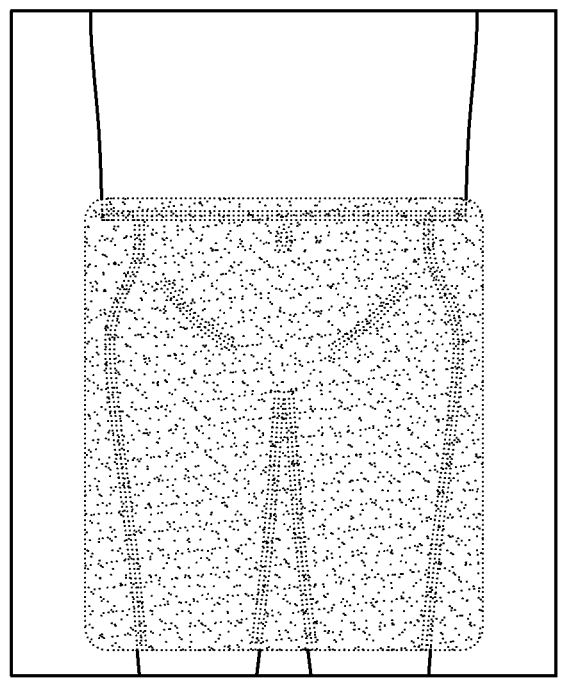
FIG. 11 is a view illustrating a video displayed on a display of a terminal according to an embodiment of the present disclosure.

FIG. 11 is a view illustrating a video displayed on a display of a terminal according to an embodiment of the present disclosure.

Referring to FIG. 2 and FIGS. 9 to 11, the processor 150 may sequentially censor a plurality of frames by using a censorship algorithm, and when it is determined that an inappropriate element is included in at least one of the plurality of frames, the processor 150 may perform video processing of a video captured by the terminal 100 after the time when the inappropriate element is detected.

In some embodiments, the processor 150 may select a target region subjected to video processing in each target frame included in a video captured by the terminal 100 after the time when the inappropriate element is detected. The processor 150 may select a region corresponding to a skin color within each target frame or select the entire region as a target region.

The skin color may have at least one color. Skin colors of respective persons may be different from each other, and thus, the processor 150 may detect regions corresponding to various skin colors as a target region. Each pixel included in the selected target region may have a skin color.

In some embodiments, the processor 150 may apply a mosaic effect or a blur effect to the target region. As another embodiment, the processor 150 may adjust hue, brightness, contrast, or chroma of the target region. As another embodiment, the processor 150 may perform a combination of the above-described video processing. As another embodiment, the processor 150 may replace a target region with another video. The processor 150 may control the communication interface 140 to output a video subjected to video processing to the counterpart terminal 200.

In some embodiments, the processor 150 may control the communication interface 140 so that a sound received by the input/output interface 110 of the terminal 100 is not output to the counterpart terminal 200. A user who provides a video including an inappropriate element also has a high probability of providing a voice including an inappropriate element, the processor 150 of the terminal 100 may limit an output of the sound.

Figure 12:
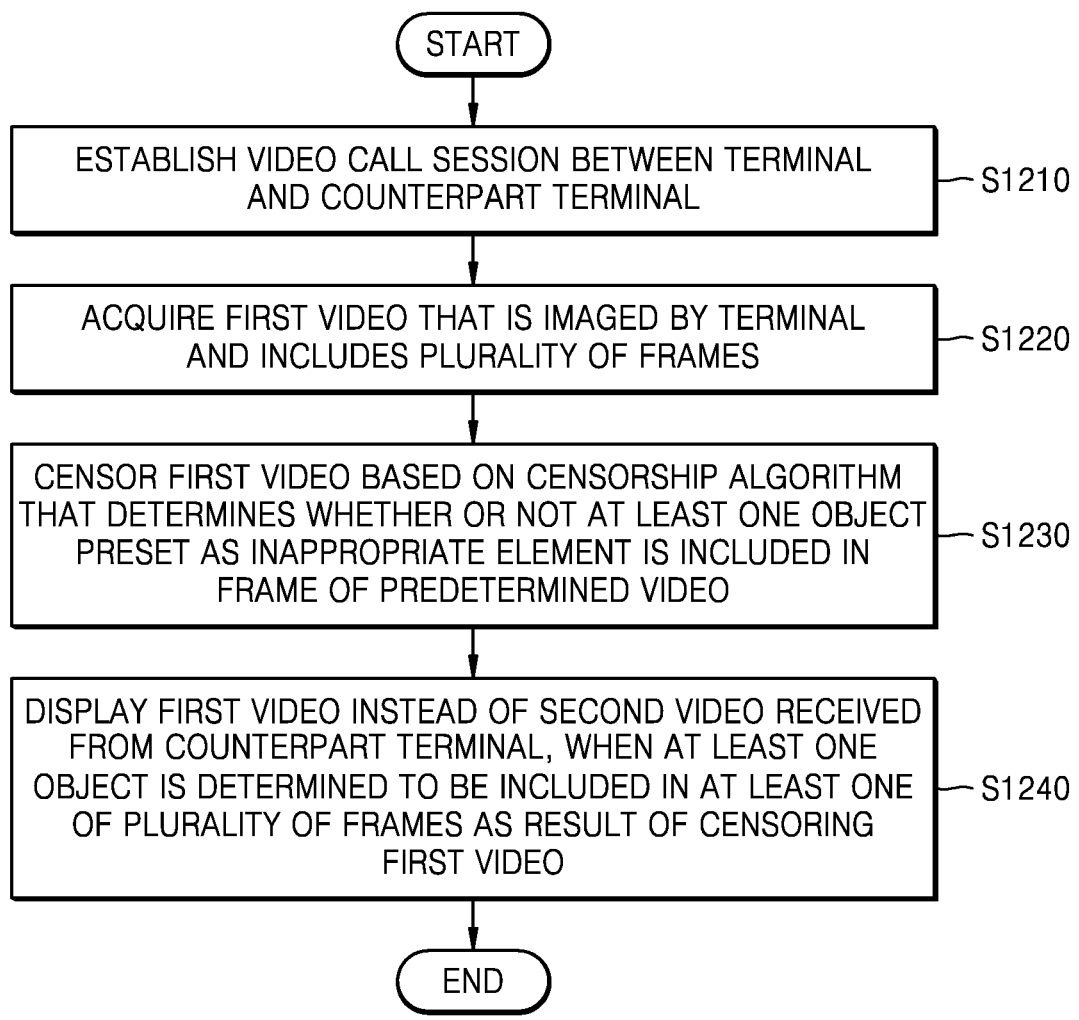
FIG. 12 is a flowchart illustrating a method of inspecting a video captured by a terminal, according to an embodiment of the present disclosure.

FIG. 12 is a flowchart illustrating a method of censoring a video captured by a terminal, according to an embodiment of the present disclosure.

Referring to FIG. 12, in step S1210, the terminal 100 may establish a video call session between the terminal 100 and the counterpart terminal 200.

For example, the terminal 100 may establish the video call session between the counterpart terminal 200 and the terminal 100 of a video call through an application for providing a video call service. A video call service may mean a service in which each of a plurality of users transmits his/her own video to a counterpart by using the terminal 100 of each user and receives a video of a counterpart, thereby exchanging intentions. The video call session may mean a state in which the terminal 100 is connected to the counterpart terminal 200 so that a first user of the terminal 100 and a second user of the counterpart terminal 200 may make a video call.

In step S1220, the terminal 100 may acquire a first video that is imaged by the terminal 100 and includes a plurality of frames. For example, the terminal 100 may acquire the first video including the plurality of frames by imaging the first user through a camera in the terminal 100.

In step S1230, the terminal 100 may censor the first video based on a censorship algorithm that determines whether or not at least one object preset as an inappropriate element is included in a frame of a predetermined video.

For example, the censorship algorithm may be an algorithm in which an operation of detecting a frame including at least one object is learned, based on a plurality of reference frames and information indicating whether or not at least one object preset as an inappropriate element is included in each of the plurality of reference frames.

For example, at least one object may include at least one of a preset body part, a preset gesture, a preset article, and a preset material. For example, the preset body part may include a chest, a genital organ, a body part around the genital organ, abdomen, hip, and so on. For example, the preset gesture may include a gesture relating to sexual behavior, unsanitary behavior, or violent behavior. For example, the preset article may be sexual activity, unsanitary activity, an article relating to violent activity, drugs, and so on. For example, the preset material may be excrement, blood, anti-social material, or so on.

For example, the terminal 100 may apply the first video to a censorship algorithm as an input video. The terminal 100 may determine whether or not there is at least one object in the first video through the censorship algorithm. Specifically, the terminal 100 may calculate a probability that there is at least one object in the first frame constituting the first video, based on a criterion for determining whether or not at least one object preset as an inappropriate element is included in a predetermined frame. When the calculated probability exceeds a threshold probability, the terminal 100 may determine the first frame as an inappropriate frame including at least one object.

In addition, the terminal 100 may calculate a similarity between an inappropriate reference frame and a first frame constituting the first video, based on a criterion for determining whether or not at least one object preset as an inappropriate element is included in a predetermined frame. When the calculated similarity exceeds a threshold similarity, the terminal 100 may determine the first frame as an inappropriate frame including at least one object.

For example, the terminal 100 may censor a plurality of frames based on a censorship algorithm before the first video acquired from the terminal 100 is transmitted to the counterpart terminal 200, according to a video call session. In this case, the terminal 100 may censor frames constituting a video captured in real time by using a censorship algorithm.

For example, the terminal 100 may censor randomly sampled frames among a plurality of frames based on a censorship algorithm. When randomly sampled frames are determined as normal frames, the terminal 100 may transmit the first video to the counterpart terminal 200. After the first video is transmitted to the counterpart terminal 200, the terminal 100 may censor the remaining frames that are not randomly sampled among the plurality of frames. When the remaining frames are determined as normal frames, the terminal 100 may censor a video captured by the terminal 100 during a video call session. When at least one of the remaining frames is determined as an inappropriate video, the terminal 100 may perform the operation according to step S1240.

In step S1240, when it is determined that at least one object is included in at least one of the plurality of frames as a result of censoring the first video, the terminal 100 may display the first video instead of a second video received from the counterpart terminal 200.

For example, the terminal 100 may display the first video in a region where a video of a counterpart received from the counterpart terminal 200 is intended to be displayed according to establishment of a video call session. In this case, display of a video of a counterpart may be stopped in a region where the video of the counterpart is intended to be displayed. In addition, the terminal 100 may control at least one frame not to be transmitted to the counterpart terminal 200.

For example, a region where a video is displayed in the terminal 100 according to a video call session may be divided into a counterpart region where a video of a counterpart is displayed and my region where a video of a user is displayed. For example, a size of the region of the counterpart may be larger than a size of my region. In addition, my region may be placed at a partial position in a screen of a display on which a video is displayed in the terminal 100. For example, some positions may be a region near a corner of the screen. In addition, my region may be displayed to be superimposed on a counterpart region and may be placed in a partial region of the counterpart region.

For example, the terminal 100 may remove a region where a video of a counterpart received from the counterpart terminal 200 is intended to be displayed according to establishment of a video call session and display the first video by enlarging a region where a video of a user acquired from the terminal 100 is intended to be displayed.

For example, the terminal 100 may display at least one frame during a preset time. For example, the preset time may be 30 seconds, 1 minute, or so on. In addition, until a video captured by the terminal 100 is determined as a normal video, the terminal 100 may display at least one frame.

By displaying a video of a user that provides an inappropriate element in a region where a counterpart video is intended to be displayed, it is possible to provide a psychological shock to the user in a video call and to stop imaging of the inappropriate element.

Figure 13:
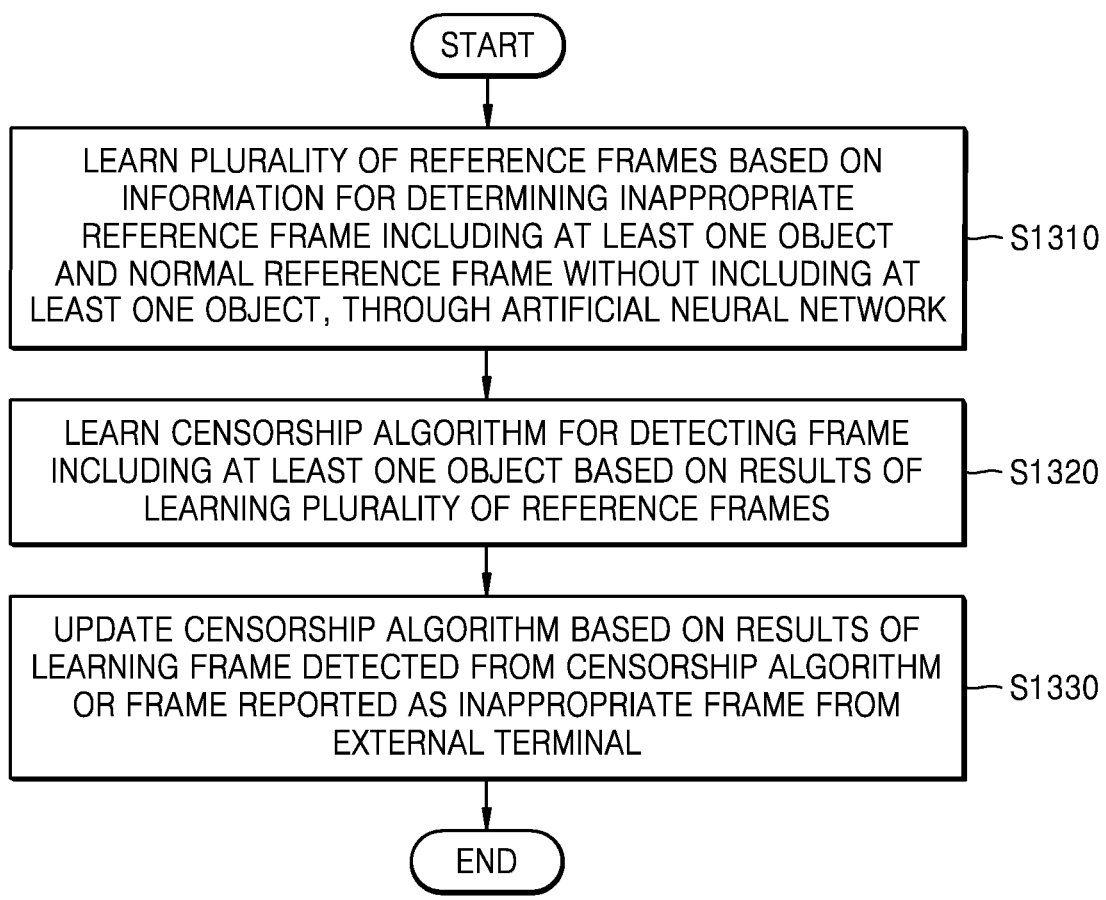
FIG. 13 is a flowchart illustrating a method of learning and updating a censorship algorithm by using a terminal, according to an embodiment of the present disclosure.

FIG. 13 is a flowchart illustrating a method of learning and updating a censorship algorithm by using the terminal 100, according to an embodiment of the present disclosure.

The terminal 100 may prepare a censorship algorithm for determining whether or not at least one object preset as an inappropriate element is included in a frame of a predetermined video. For example, preparing a censorship algorithm may mean that the terminal 100 acquires a censorship algorithm for censoring a predetermined video and stores the acquired censorship algorithm. In addition, preparing the censorship algorithm may mean that the terminal 100 acquires a censorship algorithm for censoring a predetermined video in the terminal 100 and forms a state in which the predetermined video may be censored by using the censorship algorithm when the predetermined video is input as an input video.

For example, the censorship algorithm may be an algorithm in which an operation of detecting a frame including at least one object is learned, based on a plurality of reference frames and information indicating whether or not at least one object preset as an inappropriate element is included in each of a plurality of reference frames.

For example, a censorship algorithm may be generated through an artificial intelligence (AI) system. The artificial intelligence system may mean a system in which a computer machine implementing human-level intelligence learns and determines by itself, thereby, increasing accuracy. For example, a censorship algorithm may learn characteristics of input data based on deep learning for classifying and learning by itself. Here, the input data may be a plurality of reference frames and information indicating whether or not at least one object preset as an inappropriate element is included in each of the plurality of reference frames.

For example, the terminal 100 may learn a censorship algorithm and censor a video captured by the terminal 100 by using the learned censorship algorithm. In addition, the terminal 100 may update a censorship algorithm by relearning the censorship algorithm based on a censorship result obtained from the censorship algorithm and information on a new video. In addition, the terminal 100 may receive a censorship algorithm from a server providing a video call service. In addition, the terminal 100 may receive the updated censorship algorithm from the server.

Specifically, referring to FIG. 13, in step S1310, the terminal 100 may learn a plurality of reference frames, based on information for determining an inappropriate reference frame including at least one object and a normal reference frame without including at least one object, through an artificial neural network.

For example, at least one object may include at least one of a preset body part, a preset gesture, a preset article, and a preset material.

For example, information for determining an inappropriate reference frame and a normal reference frame may be tag information indicating whether each of the reference frames is an inappropriate reference frame or a normal frame. The terminal 100 may acquire a predetermined reference frame and tag information of the predetermined reference frame as input information. The terminal 100 may learn a predetermined reference frame based on the tag information of the predetermined reference frame through an artificial neural network to learn a criterion for determining whether or not at least one object preset as an inappropriate element is included in the predetermined frame.

For example, a criterion for determining whether or not at least one object preset as an inappropriate element is included in a predetermined frame may be a criterion for determining a probability that there is at least one object in a predetermined frame by using at least one of a configuration of at least one object, a color of at least one object, and an arrangement between at least one object and surrounding objects. For example, when a probability that there is at least one object in a predetermined frame is 90% or more, the predetermined frame may be determined as an inappropriate frame including an inappropriate element.

For example, the criterion for determining whether or not at least one object preset as an inappropriate element is included in a predetermined frame may be a criterion for determining a similarity between an inappropriate reference frame including at least one object and a predetermined frame. For example, the similarity may be a value representing a degree of similarity between a reference frame and a predetermined frame by using at least one of a configuration of at least one object in a frame, a color of at least one object, and an arrangement between at least one object and surrounding objects. For example, when a similarity between an inappropriate reference frame and a predetermined frame is 90% or more, the predetermined frame may be determined as an inappropriate frame including an inappropriate element.

In step S1320, the terminal 100 may learn a censorship algorithm for detecting a frame including at least one object based on results of learning a plurality of reference frames.

Specifically, the terminal 100 may determine whether or not a video including a plurality of frames or a predetermined frame includes at least one object, based on results of learning a plurality of reference frames, and learn a censorship algorithm for detecting a frame including at least one object.

In step S1330, the terminal 100 may update a censorship algorithm based on results of learning a frame detected from the censorship algorithm or a frame reported as an inappropriate frame from the external terminal 100.

For example, the terminal 100 may acquire a first frame detected from the censorship algorithm. The terminal 100 may learn a first frame based on the first frame and information indicating that an object preset as an inappropriate element is included in the first frame. The terminal 100 may update a censorship algorithm based on results of learning the first frame.

For example, the terminal 100 may acquire a second frame reported as an inappropriate frame from the external terminal 100. For example, the external terminal 100 may be a terminal 100 having a history of establishing a video call session with the terminal 100. In addition, the external terminal 100 may be a terminal 100 having a history of using a video call service. For example, the terminal 100 may receive a second frame reported as an inappropriate frame from the external terminal 100 or a server. The terminal 100 may learn a second frame based on the second frame and information indicating that an object preset as an inappropriate element is included in the second frame. The terminal 100 may update a censorship algorithm based on results of learning the second frame.

By updating the censorship algorithm, the terminal 100 may accurately and quickly determine whether or not an inappropriate frame is included in the captured video.

Figure 14:
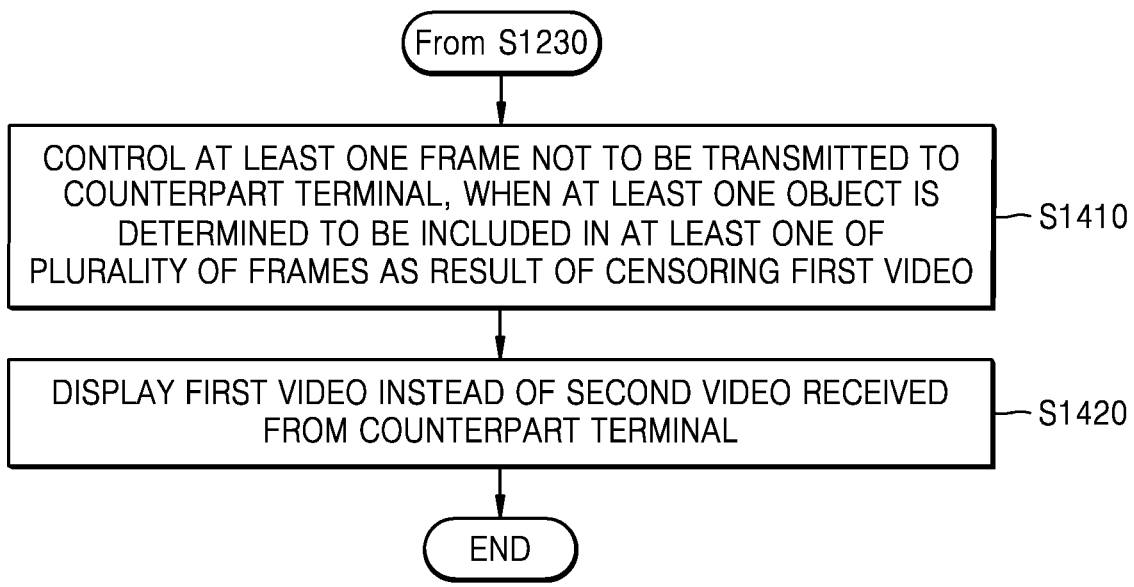
FIG. 14 is a flowchart illustrating an operating method of a terminal when a frame including an inappropriate element is detected in a terminal according to an embodiment of the present disclosure.

FIG. 14 is a flowchart illustrating an operating method of the terminal 100 when a frame including an inappropriate element is detected from the terminal 100 according to an embodiment of the present disclosure.

Referring to FIG. 14, in step S1410, when it is determined that at least one object is included in at least one of a plurality of frames as a result of censoring the first video, the terminal 100 may control at least one frame not to be transmitted to the counterpart terminal 200.

For example, when it is determined that at least one object is included in the first frame of the plurality of frames as a result of censoring the first video, the terminal 100 may control a second frame next to the first frame and subsequent frames not to be transmitted to the counterpart terminal 200. For example, when the first video is transmitted to the counterpart terminal 200, the second frame may be a frame acquired after the first video is transmitted to the counterpart terminal 200. For example, when a $1\text{-}1^{th}$ frame next to the first frame among a plurality of frames is transmitted to the counterpart terminal 200, the second frame may be a frame next to the 1-1$^{th}$ frame.

In addition, the terminal 100 may perform video processing for a target region in which at least one object is displayed so that at least one object is not displayed within at least one frame. The terminal 100 may transmit at least one frame having a video-processed target region to the counterpart terminal 200.

In addition, the terminal 100 may control a signal corresponding to a sound acquired by the terminal 100 not to be transmitted to the counterpart terminal 200.

In step S1420, the terminal 100 may display the first video instead of the second video received from the counterpart terminal 200.

For example, the terminal 100 may display the first video in a region in which a video of a counterpart received from the counterpart terminal 200 is intended to be displayed according to establishment of a video call session.

For example, the terminal 100 may remove the region where the video of the counterpart received from the counterpart terminal 200 is intended to be displayed according to the establishment of the video call session and display the first video by enlarging a region where a video of a user acquired from the terminal 100 is intended to be displayed.

For example, the terminal 100 may display at least one frame during a preset time.

Figure 15:
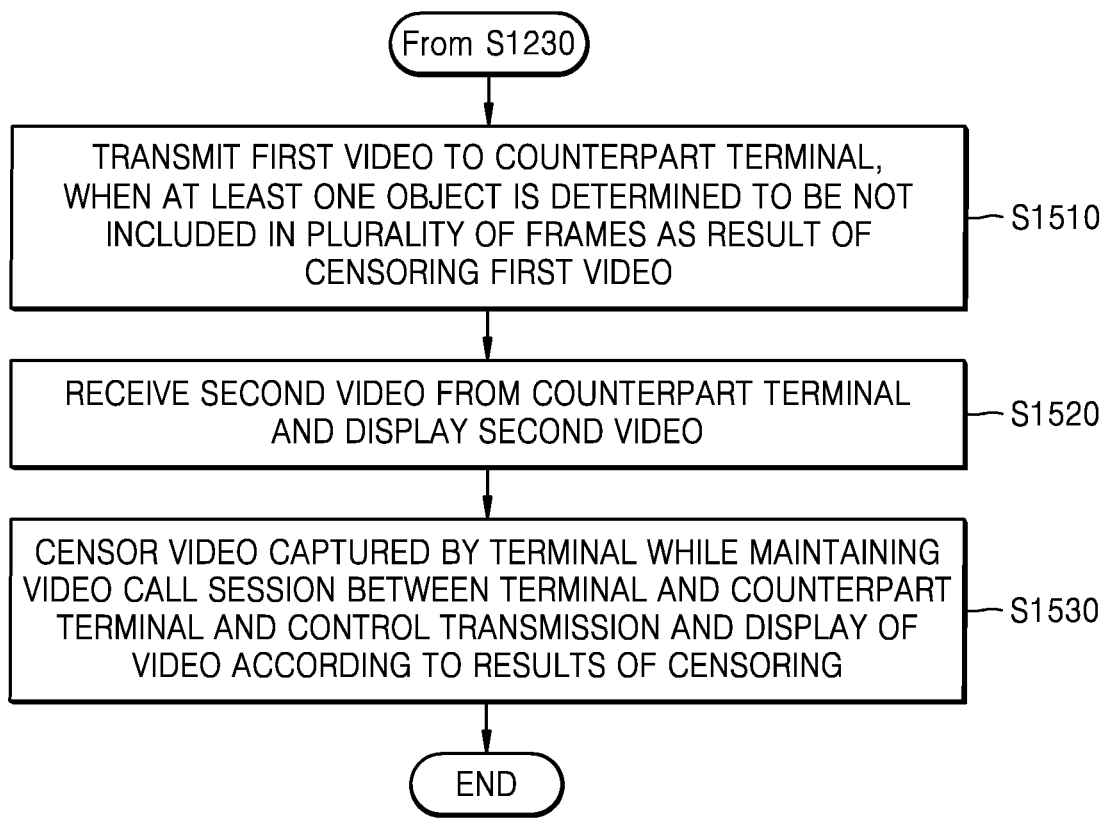
FIG. 15 is a flowchart illustrating an operating method of a terminal when a frame including an inappropriate element is not detected in a terminal according to an embodiment of the present disclosure.

FIG. 15 is a flowchart illustrating an operating method of the terminal 100 when a frame including an inappropriate element is not detected in the terminal 100 according to an embodiment of the present disclosure.

Referring to FIG. 15, in step S1510, when it is determined that at least one object is not included in a plurality of frames as a result of censoring the first video, the terminal 100 may transmit the first video to the counterpart terminal 200.

In step S1520, the terminal 100 may receive a second video from the counterpart terminal 200 and display the second video.

In step S1530, the terminal 100 may censor a video captured by the terminal 100 while maintaining a video call session between the terminal 100 and the counterpart terminal 200. The terminal 100 may control transmission and display of a video according to the result of censoring the video.

Figure 16:
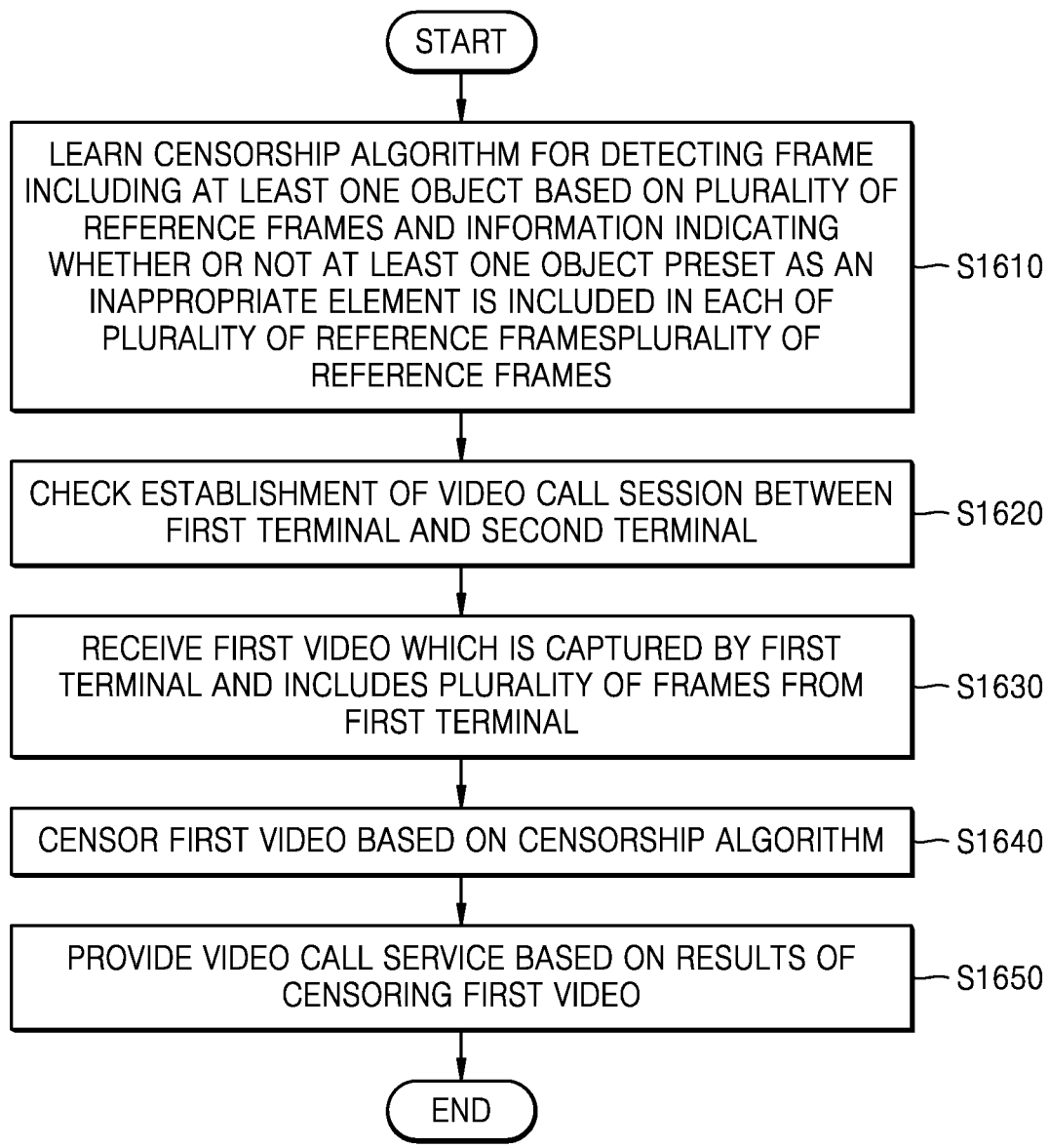
FIG. 16 is a flowchart illustrating a method of censoring a video received from a terminal and providing a video call service according to the result of censoring the video by using a server, according to an embodiment of the present disclosure.

FIG. 16 is a flowchart illustrating a method of censoring a video received from a terminal and providing a video call service according to the result of censoring the video by using a server, according to an embodiment of the present disclosure.

Referring to FIG. 16, in step S1610, the server 400 may learn a censorship algorithm for detecting a frame including at least one object preset as an inappropriate element. For example, a censorship algorithm may be learned based on a plurality of reference frames and information indicating whether or not at least one object preset as an inappropriate element is included in each of the plurality of reference frames.

In step S1620, the server 400 may check establishment of a video call session between a first terminal and a second terminal.

In step S1630, the server 400 may receive a first video which is captured by the first terminal and includes a plurality of frames from the first terminal.

In step S1640, the server 400 may censor the first video based on a censorship algorithm.

For example, the server 400 may determine whether or not there is at least one object in the first video through a censorship algorithm. Specifically, the server 400 may calculate a probability that there is at least one object in the first frame constituting the first video, based on a criterion for determining whether or not at least one object preset as an inappropriate element is included in a predetermined frame. When the calculated probability exceeds a threshold probability, the server 400 may determine the first frame as an inappropriate frame including at least one object.

For example, the server 400 may calculate a similarity between an inappropriate reference frame and a first frame constituting the first video, based on a criterion for determining whether or not at least one object preset as an inappropriate element is included in a predetermined frame. When the calculated similarity exceeds a threshold similarity, the server 400 may determine the first frame as an inappropriate frame including at least one object.

For example, the server 400 may censor a plurality of frames constituting the first video based on a censorship algorithm before the first video is transmitted to the second terminal.

For example, the server 400 may censor randomly sampled frames among a plurality of frames based on a censorship algorithm. When it is determined that the randomly sampled frames are normal frames, the server 400 may control an operation of the first terminal so that the first video may be transmitted to the second terminal. After the first video is transmitted to the second terminal, the server 400 may censor the remaining frames that are not randomly sampled among the plurality of frames. When it is determined that the remaining frames are normal frames, the server 400 may censor a video captured by the first terminal during a video call session.

In steps S1630 to S1640, a process in which the server 400 censors the video captured by the first terminal is described, and the server 400 may censor a video captured by the second terminal in the same manner as described above.

In step S1650, the server 400 may provide a video call service based on results of censoring the first video.

For example, when a frame including at least one object is detected from the first video, the server 400 may control an operation of the first terminal so that the first video is not transmitted to the second terminal. In addition, the server 400 may control the operation of the first terminal so that the first video is displayed in a region where a video received from the second terminal is displayed on the first terminal.

For example, when a frame including at least one object is not detected from the first video, the server 400 may control the operation of the first terminal so that the first video is transmitted to the second terminal.

Figure 17:
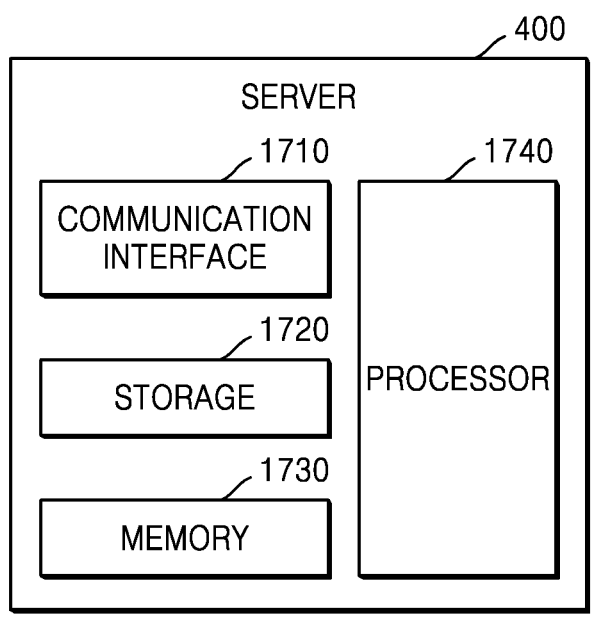
FIG. 17 is a block diagram illustrating a configuration of a server according to an embodiment of the present disclosure.

FIG. 17 is a block diagram illustrating a configuration of the server 400 according to an embodiment of the present disclosure.

Referring to FIG. 17, the server 400 may include a communication interface 1710, a storage 1720, a memory 1730, and a processor 1740. In addition to the configuration elements illustrated in FIG. 17, other general-purpose configuration elements may be included in the server 400.

The communication interface 1710 may communicate with an external device including a terminal. For example, the server 400 may receive a request for starting a video call service from a terminal, a request for setting information for establishing a video call service environment, and so on and may provide all items relating to the video call service in response to a request of the terminal.

The storage 1720 may store various types of software and information necessary for the server 400 to provide a video call service. For example, the storage 1720 may store programs executed by the server 400, applications, and various types of data used for a video call service.

The storage 1720 may store personal information for each user who uses a video call service in a database and manage the personal information. The storage 1720 may store personal information of a user and various information used for a video call service for each account for accessing the server 400 that proves the video call service.

For example, the storage 1720 may store a censorship algorithm for detecting a frame including at least one object preset as an inappropriate element from a video acquired from a terminal. In addition, the storage 1720 may store a plurality of reference frames and information indicating whether or not at least one object preset as an element inappropriate is included in each of the plurality of reference frames, which are used to learn a censorship algorithm. In addition, the storage 1720 may store results of learning a censorship algorithm.

The memory 1730 may store commands that may be executed by the processor 1740. The memory 1730 may store software or a program.

The processor 1740 may execute the commands stored in the memory 1730. The processor 1740 may perform overall control of the server 400 that provides a video call service. The processor 1740 may acquire information and a request received through the communication interface 1710 and store the received information in the storage 1720. In addition, the processor 1740 may process the received information. For example, the processor 1740 may generate information used for a video call service from information received from a terminal or perform a processing operation of managing the received information and store the information in the storage 1720. In addition, the processor 1740 may transmit information for providing a video call service to a terminal through the communication interface 1710 by using the information stored in the storage 1720 as a response to a request acquired from a terminal.

The processor 1740 may learn a censorship algorithm for detecting a frame including at least one object preset as an inappropriate element. For example, the censorship algorithm may be learned based on a plurality of reference frames and information indicating whether or not at least one object preset as an inappropriate element is included in each of the plurality of reference frames.

The processor 1740 may check establishment of a video call session between a first terminal and a second terminal.

The processor 1740 may receive a first video, which is captured by the first terminal and includes a plurality of frames, from the first terminal through the communication interface 1710.

The processor 1740 may censor the first video based on a censorship algorithm. The processor 1740 may determine whether or not there is at least one object in the first video through a censorship algorithm. Specifically, the processor 1740 may calculate a probability that there is at least one object in a first frame constituting the first video, based on a criterion for determining whether or not at least one object preset as an inappropriate element is included in a predetermined frame. When the calculated probability exceeds a threshold probability, the processor 1740 may determine the first frame as an inappropriate frame including at least one object.

For example, the processor 1740 may calculate a similarity between an inappropriate reference frame and a first frame constituting the first video, based on a criterion for determining whether or not at least one object preset as an inappropriate element is included in a predetermined frame. When the calculated similarity exceeds a threshold similarity, the processor 1740 may determine the first frame as an inappropriate frame including at least one object.

For example, the processor 1740 may censor a plurality of frames constituting the first video based on a censorship algorithm before the first video is transmitted to a second terminal.

For example, the processor 1740 may censor randomly sampled frames among a plurality of frames based on a censorship algorithm. When it is determined that the randomly sampled frames are normal frames, the processor 1740 may control an operation of the first terminal so that the first video may be transmitted to the second terminal. After the first video is transmitted to the second terminal, the processor 1740 may censor the remaining frames that are not randomly sampled among a plurality of frames. When it is determined that the remaining frames are normal frames, the processor 1740 may censor a video captured by the first terminal during a video call session.

The processor 1740 may censor a video captured by the second terminal in the same manner as described above.

The processor 1740 may provide a video call service based on results of censoring the first video.

For example, when a frame including at least one object is detected from the first video, the processor 1740 may control an operation of the first terminal so that the first video is not transmitted to the second terminal. In addition, the processor 1740 may control the operation of the first terminal so that the first video is displayed in a region where a video received from the second terminal is displayed on the first terminal.

For example, when a frame including at least one object is not detected from the first video, the processor 1740 may control the operation of the first terminal so that the first video is transmitted to the second terminal.

As described with reference to FIGS. 1 to 17, each user of the plurality of terminals 100 to 300 may be prevented from being exposed to an obscene video from a counterpart when making a video call with the counterpart through an application for providing a video call session.

In addition, each user of the plurality of terminals 100 to 300 may avoid sexual shame or displeasure that may be felt by a video from the counterpart when making a video call with the counterpart through an application for providing a video call session, The plurality of terminals 100 to 300 may induce a sound video call between users through an application for providing a video call session.

The embodiments described above may also be implemented in the form of a recording medium including commands that may be executed by a computer such as a program module executed by a computer. A computer-readable recording medium may be any available medium that may be accessed by a computer and may include all of volatile and nonvolatile media and removable and non-removable media.

In addition, a computer-readable recording medium may include a computer storage medium or a communication medium. A computer storage medium may include all of volatile and nonvolatile media and removable and non-removable media implemented by any method or technology for storing information such as computer-readable commands, data structures, program modules, or other data. Communication media generally include computer-readable commands, data structures, program modules, other data of a modulated data signal such as a carrier wave, or other output mechanisms and may include any information transfer medium.

According to the embodiment described above, a user making a video call with a counterpart may be prevented from being exposed to an obscene video from the counterpart.

In addition, according to the embodiment, a user making a video call with a counterpart may be prevented from feeling sexual shame or displeasure due to a video from the counterpart.

In addition, according to the embodiment, a sound video call between users may be induced.

Although the embodiments of the present disclosure are described with reference to the accompanying drawings above, those skilled in the art to which the present disclosure belongs may understand that the present disclosure may be implemented in other certain forms without changing the technical idea or essential features. Therefore, it should be understood that the embodiments described above are illustrative in all respects and are not restrictive.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An operating method of a terminal, the method comprising:
    establishing a video call session between the terminal and a counterpart terminal;
    acquiring a first video that is captured by the terminal and includes a plurality of frames;
    displaying a second video that is captured by the counterpart terminal in a display of the terminal;
    censoring the first video based on a censorship algorithm for determining whether or not at least one object preset as an inappropriate element is included in a frame within a video; and
    displaying the first video on the display instead of the second video received from the counterpart terminal when it is determined that the at least one object is included in at least one of the plurality of frames of the first video as a result of censoring the first video.

2. The operating method of the terminal of claim 1, wherein the second video is displayed in a region of the display and displaying of the first video on the display instead of the second video comprises:
    displaying the first video in the region where the second video received from the counterpart terminal is intended to be displayed according to the establishing of the video call session; and
    controlling the at least one frame not to be transmitted to the counterpart terminal.

3. The operating method of the terminal of claim 1 further comprising displaying the first video in a first region of the display, wherein the second video is displayed in a second region of the display, wherein the displaying of the first video instead of the second video comprises:

removing the second region where the second video received from the counterpart terminal is intended to be displayed according to the establishing of the video call session
    displaying the first video by enlarging the first region where the first video captured by the terminal is displayed; and
    displaying the at least one frame in the first region during a preset time.

4. The operating method of the terminal of claim 1, further comprising:
    preparing the censorship algorithm in which an algorithm for detecting a frame including the at least one object is learned, based on a plurality of reference frames and information indicating whether or not the at least one object preset as the inappropriate element is included in each of the plurality of reference frames.

5. The operating method of the terminal of claim 4, wherein the preparing of the censorship algorithm comprises:
    learning the plurality of reference frames based on information for determining an inappropriate reference frame including the at least one object and a normal reference frame without including the at least one object, through an artificial neural network; and
    learning the censorship algorithm for detecting a frame including the at least one object based on results of learning the plurality of reference frames.

6. The operating method of the terminal of claim 4, wherein the preparing of the censorship algorithm includes updating the censorship algorithm stored in the terminal, and
    wherein the updating of the censorship algorithm includes at least one of:
        updating the censorship algorithm based on results of learning a first frame detected from the censorship algorithm or a second frame reported as an inappropriate frame from an external terminal, and
        receiving an updated censorship algorithm from a server.

7. The operating method of the terminal of claim 5, wherein the learning of the plurality of reference frames includes learning the plurality of reference frames based on at least one of a configuration of the at least one object, a color of the at least one object, and an arrangement between the at least one object and a surrounding object within the inappropriate reference frame.

8. The operating method of the terminal of claim 1, wherein the censoring of the first video based on the censorship algorithm comprises:
    calculating a probability that the at least one object is in the plurality of frames, or a similarity between a reference frame set as an inappropriate frame and the plurality of frames, based on a criterion for determining whether or not at least one object preset as an inappropriate element is included in a frame within the video; and
    detecting a frame including the at least one object from among the plurality of frames based on the calculated probability or similarity.

9. The operating method of the terminal of claim 1, wherein the censoring of the first video based on the censorship algorithm comprises censoring the plurality of frames based on the censorship algorithm before the first video acquired by the terminal according to the video call session is transmitted to the counterpart terminal.

10. The operating method of the terminal of claim 1, wherein the censoring of the first video based on the censorship algorithm comprises:
censoring a randomly sampled frame among the plurality of frames based on the censorship algorithm; and
censoring a frame that is not randomly sampled among the plurality of frames based on the censorship algorithm after the first video is transmitted to the counterpart terminal according to results of censoring the randomly sampled frame.

11. The operating method of the terminal of claim 1, further comprising:
censoring a video captured by the terminal based on the censorship algorithm before the video call session is established; and
determining whether or not to establish the video call session based on results of censoring the video.

12. The operating method of the terminal of claim 1, further comprising:
controlling a second frame next to a first frame and subsequent frames not to be transmitted to the counterpart terminal, when it is determined that the at least one object is included in the first frame among the plurality of frames as results of censoring the first video.

13. The operating method of the terminal of claim 1, further comprising at least one of:
controlling the at least one frame not to be transmitted to the counterpart terminal when it is determined that the at least one object is included in at least one of the plurality of frames as results of censoring the first video; and
performing video processing for a target region where the at least one object is displayed so that the at least one object is not displayed in the at least one frame, and transmitting at least one frame in which the target region is video-processed to the counterpart terminal.

14. A server comprising:
a communication interface that communicates with a plurality of terminals;
a storage;
a processor; and
a memory that stores commands executed by the processor,
wherein the processor executes the commands to
learn a censorship algorithm for detecting a frame including the at least one object based on a plurality of reference frames and information indicating whether or not the at least one object preset as an inappropriate element is included in each of the plurality of reference frames,
check establishment of a video call session between a first terminal and a second terminal,
receive, from the first terminal, a first video that is captured by the first terminal and includes a plurality of frames,
receive, from the second terminal, a second video that is captured by the second terminal;
control an operation of the first terminal so that the second video is displayed in a display of the first terminal;
censor the first video based on the censorship algorithm, and
control an operation of the first terminal so that the first video is displayed on the display of the first terminal instead of the second video received from the second terminal when it is determined that the at least one object is included in at least one of the plurality of frames of the first video as a result of censoring the first video.

15. A terminal comprising:
a communication interface that communicates with an external device;
an input/output interface that includes a display;
a processor; and
a memory that stores commands capable of being executed by the processor, wherein the processor executes the commands to:
establish a video call session between the terminal and a counterpart terminal,
acquire a first video including a plurality of frames imaged by the terminal,
display a second video that is captured by the counterpart terminal on the display of the terminal;
censor the first video based on a censorship algorithm for determining whether or not at least one object preset as an inappropriate element is included in a frame of a video, and
display the first video on the display instead of a second video received from the counterpart terminal when it is determined that the at least one object is included in at least one of the plurality of frames of the first video as a result of censoring the first video.

16. The operating method of the terminal of claim 1 further comprising displaying the first video in a first region of the display, wherein the second video is displayed in a second region of the display, wherein displaying the first video instead of the second video comprises displaying the first video in the second region of the display.

* * * * *